United States Patent
Okada

(10) Patent No.: US 8,824,824 B2
(45) Date of Patent: Sep. 2, 2014

(54) IMAGE PROCESSING APPARATUS, IMAGING APPARATUS, IMAGE PROCESSING METHOD, AND RECORDING MEDIUM STORING PROGRAM

(75) Inventor: Takashi Okada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/356,319

(22) Filed: Jan. 23, 2012

(65) Prior Publication Data

US 2012/0189226 A1 Jul. 26, 2012

(30) Foreign Application Priority Data

Jan. 25, 2011 (JP) ................................ 2011-013253
Jan. 25, 2011 (JP) ................................ 2011-013273
Jan. 25, 2011 (JP) ................................ 2011-013274
Jan. 25, 2011 (JP) ................................ 2011-013275

(51) Int. Cl.
*G06K 9/40* (2006.01)
(52) U.S. Cl.
USPC ...................................................... 382/260
(58) Field of Classification Search
USPC .................... 341/140; 356/124.5; 382/260
See application file for complete search history.

(56) References Cited

U.S. PATENT DOCUMENTS

| 2003/0063815 | A1* | 4/2003 | Watanabe ..................... 382/255 |
| 2004/0252906 | A1 | 12/2004 | Liege et al. |
| 2008/0013185 | A1* | 1/2008 | Garoutte et al. ............. 359/630 |
| 2010/0182485 | A1 | 7/2010 | Yoshikawa |
| 2012/0162486 | A1* | 6/2012 | Asakura et al. ............. 348/241 |

\* cited by examiner

*Primary Examiner* — Gregory F Cunningham
(74) *Attorney, Agent, or Firm* — Canon USA Inc. IP Division

(57) ABSTRACT

To prevent an increase in a data storage space required for image restoration processing, a non-transitory computer-readable storage medium according to the present invention stores a process for causing an information processing apparatus to execute a method including acquiring identification information for identifying an optical transfer characteristic for restoring an image, acquiring the optical transfer characteristic identified based on the identification information from a storage unit storing a first optical transfer characteristic commonly usable for first and second captured images captured under different imaging conditions and a second optical transfer characteristic usable for a third captured image, and generating a restored image with use of the acquired optical transfer characteristic.

11 Claims, 18 Drawing Sheets

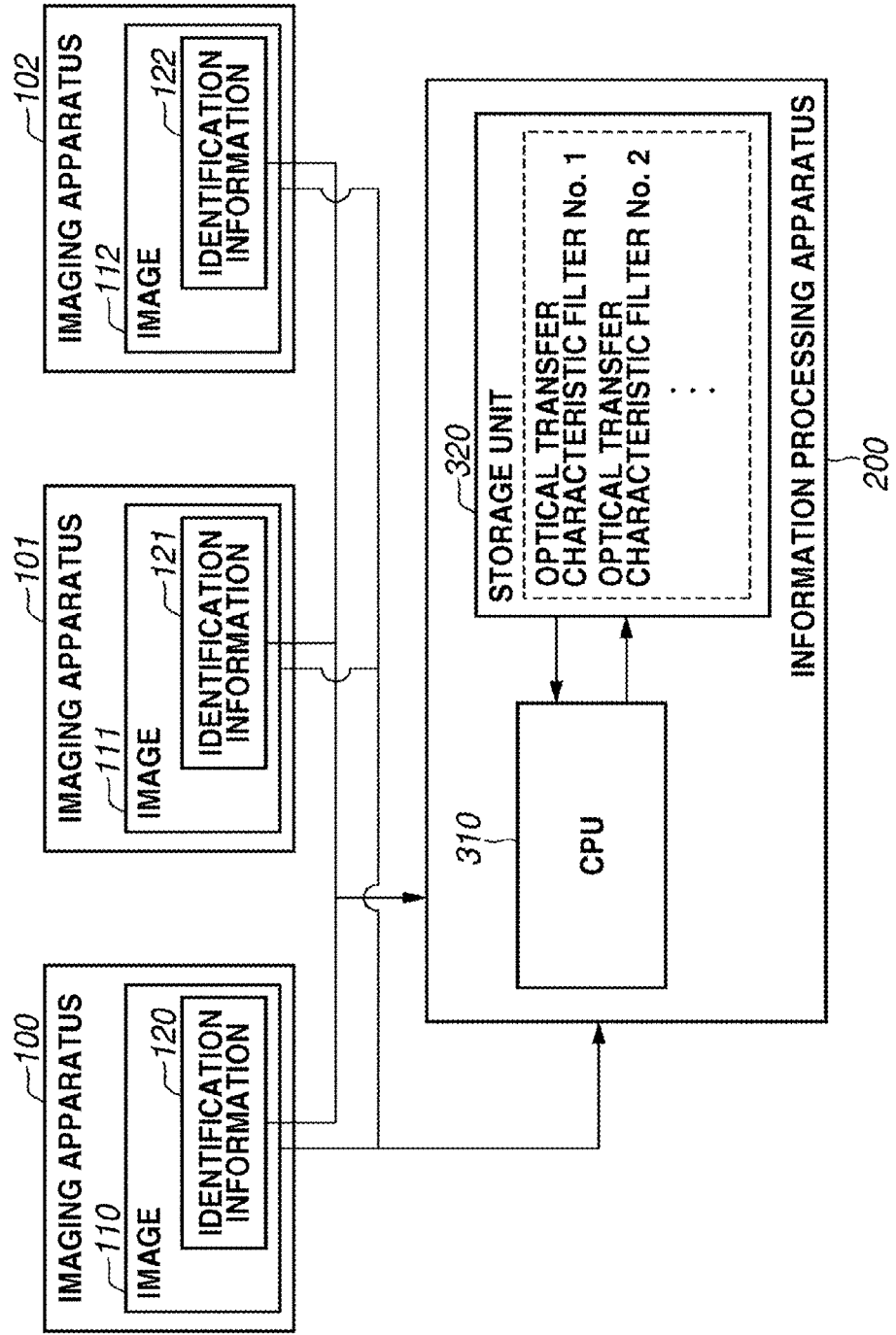

IMAGE PROFILE

IMAGE PROFILE

IMAGE RESTORATION FILTER

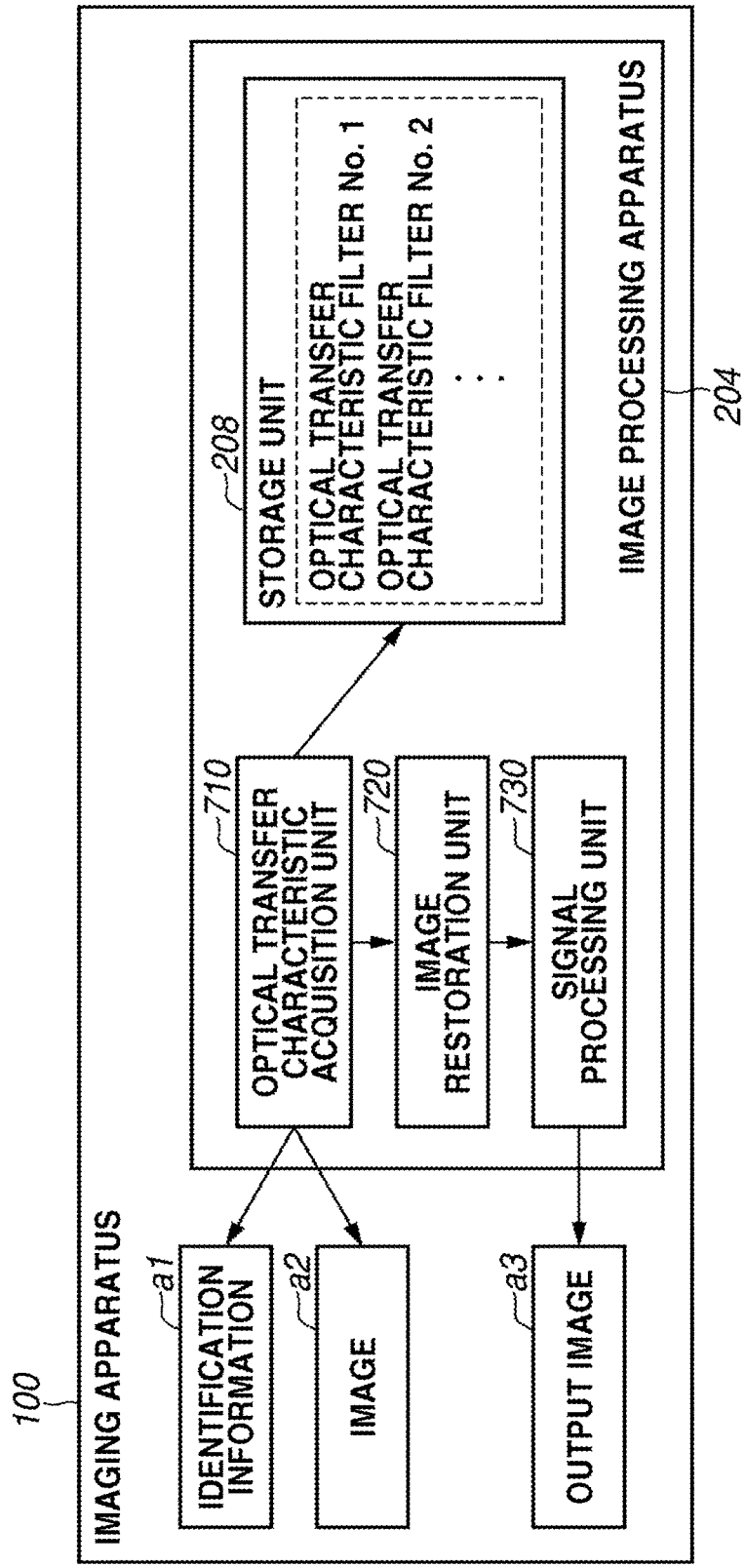

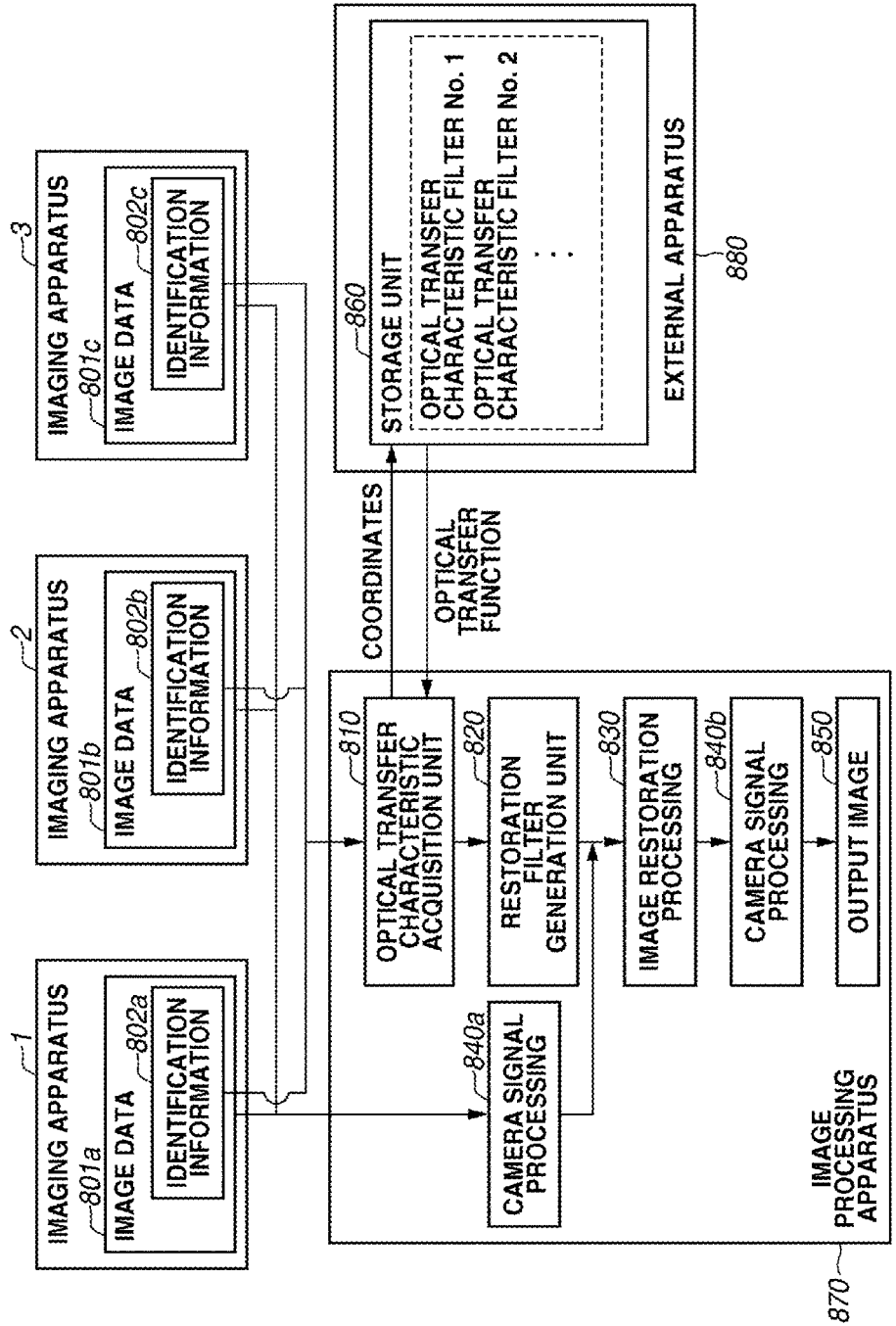

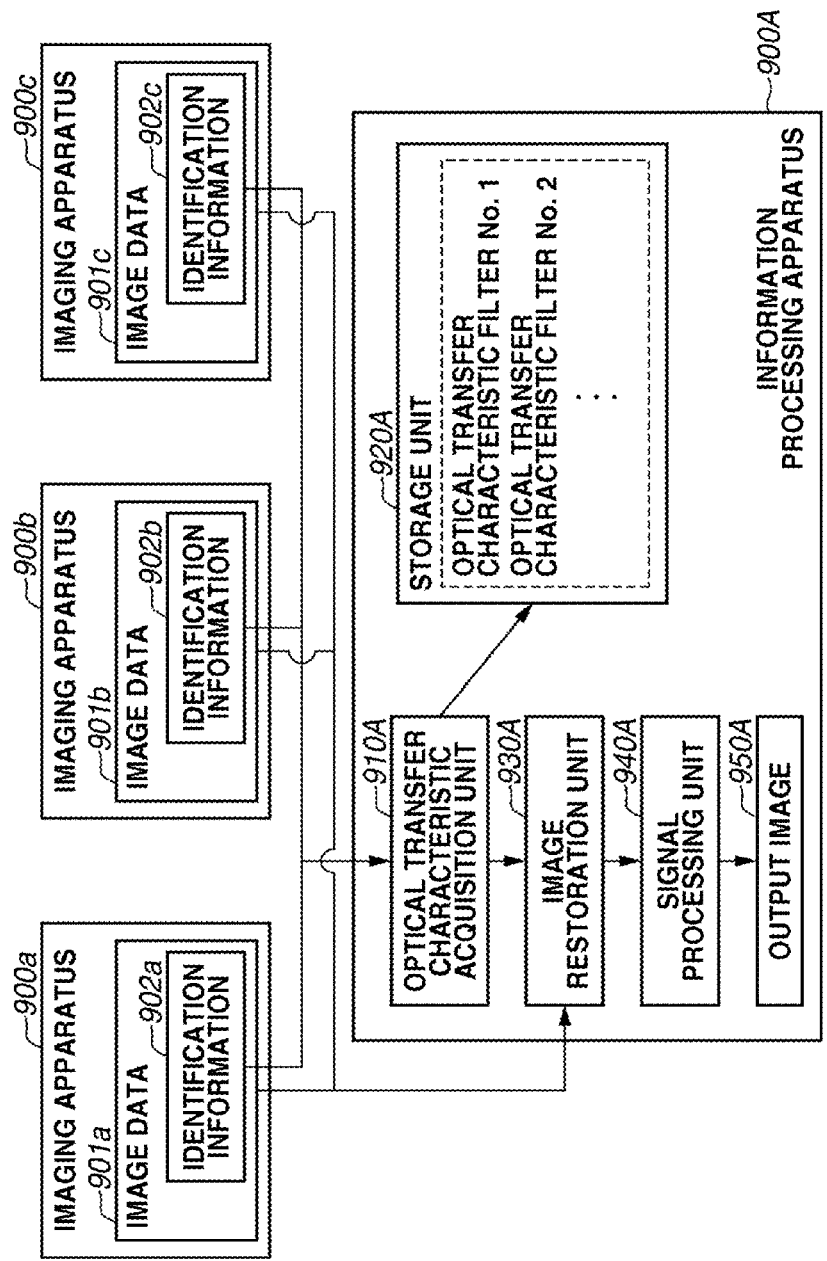

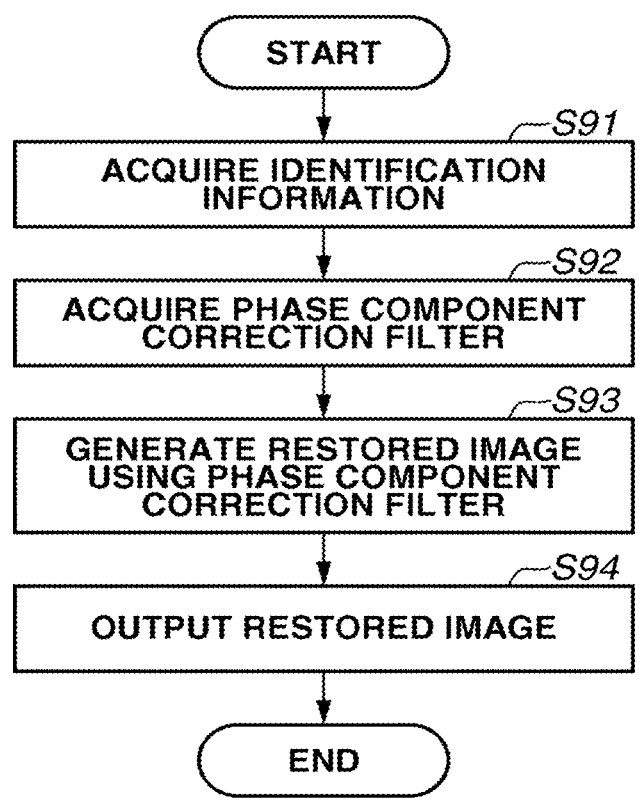

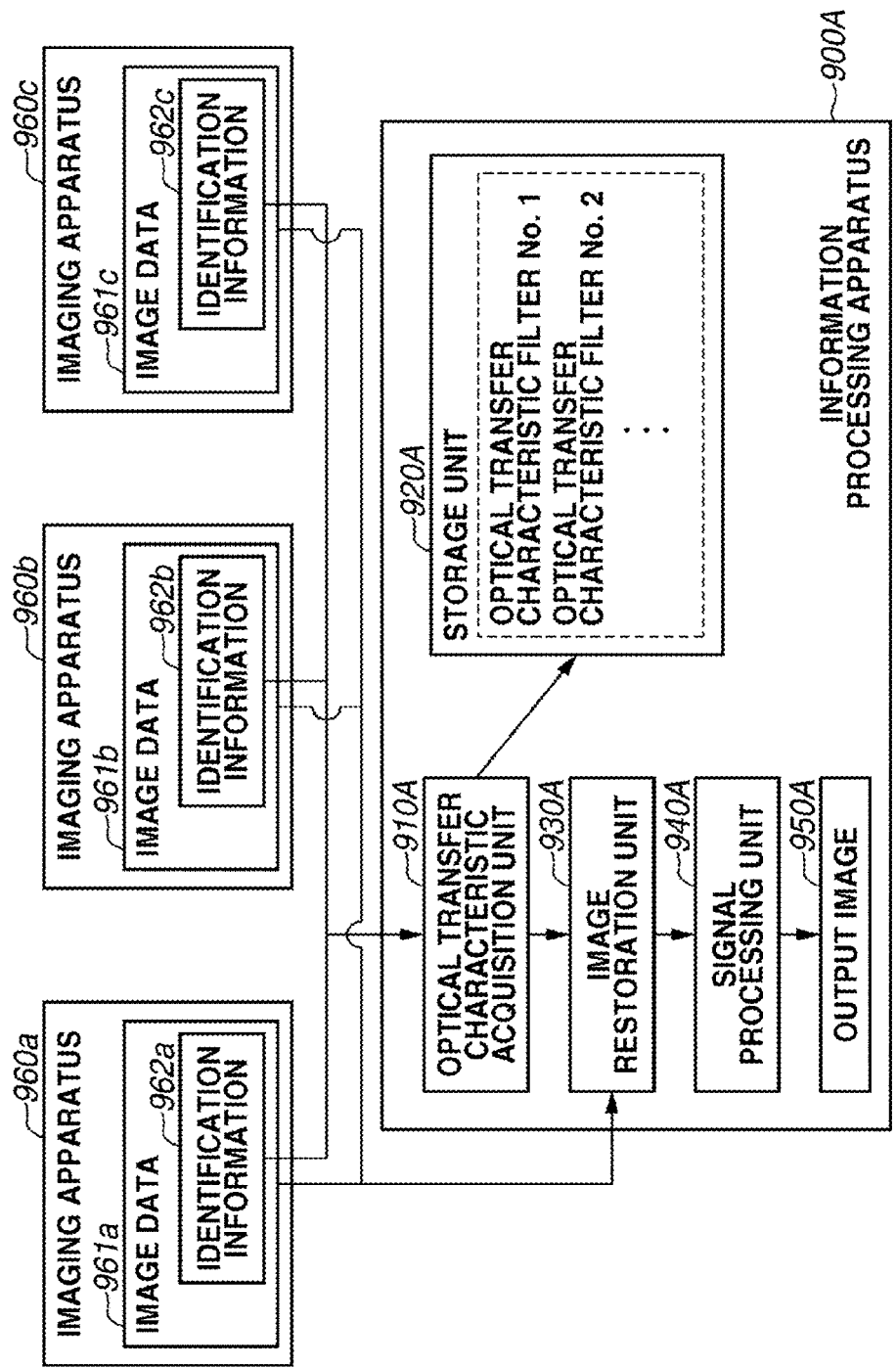

FIG.16

| FILTER WITHOUT APPLICATION OF PROCESSING | | DERIVATION FILTER | | EDGE EMPHASIS FILTER | |
|---|---|---|---|---|---|

| 0 | 0 | 0 |
|---|---|---|
| 0 | 1 | 0 |
| 0 | 0 | 0 |

−

| 0 | 1 | 0 |
|---|---|---|
| 1 | −4 | 1 |
| 0 | 1 | 0 |

=

| 0 | −1 | 0 |
|---|---|---|
| −1 | 5 | −1 |
| 0 | −1 | 0 |

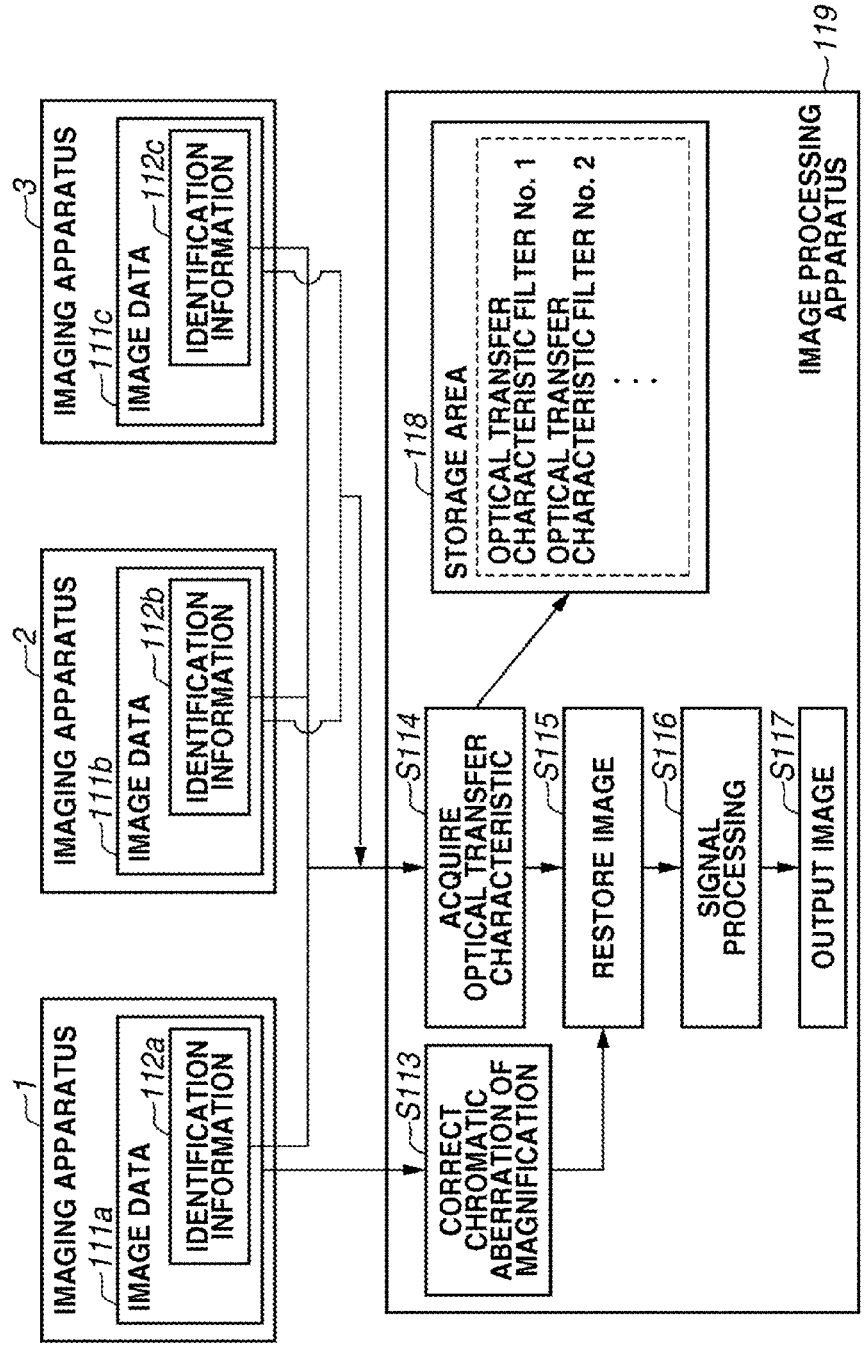

IMAGE PROCESSING APPARATUS, IMAGING APPARATUS, IMAGE PROCESSING METHOD, AND RECORDING MEDIUM STORING PROGRAM

BACKGROUND OF THE INVENTION

1. Field of the Invention

The present invention relates to a recording medium storing a program that performs image restoration processing, an image processing apparatus, an image processing method, and an imaging apparatus.

2. Description of the Related Art

One of conventional image processing methods for an image (deteriorated image) affected by an aberration of an imaging optical system of an imaging apparatus is processing of restoring (recovering) such an image with use of an optical transfer function (OTF). This method is called image restoration or image recovery. Hereinafter, the term "image restoration processing" will be used to refer to this processing of correcting or reducing a deterioration of an image with use of an optical transfer function (OTF) of an imaging optical system or any system equivalent thereto.

US Patent Application Publication No. 2010/0182485 discusses an imaging system in which a single apparatus is in charge of image restoration processing for images captured by a plurality of optical systems. US Patent Application Publication No. 2004/0252906 discusses an image processing system which corrects an image with use of information containing an index of an imaging apparatus.

SUMMARY OF THE INVENTION

According to an aspect of the present invention, a non-transitory recording medium storing a program for causing an information processing apparatus to execute a method that includes acquiring identification information for identifying an optical transfer characteristic for restoring an image, acquiring the optical transfer characteristic identified based on the identification information from a storage unit storing a first optical transfer characteristic commonly usable for first and second captured images captured under different imaging conditions, and a second optical transfer characteristic usable for a third captured image, and generating a restored image with use of the acquired optical transfer characteristic.

According to this aspect of the present invention, it is possible to reduce a data storage capacity required for image restoration processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an image processing system according to a first exemplary embodiment and a sixth exemplary embodiment of the present invention.

FIG. 10 illustrates an image processing system according to a second exemplary embodiment and a seventh exemplary embodiment of the present invention.

FIG. 11 illustrates an image processing system according to a third exemplary embodiment and an eighth exemplary embodiment of the present invention.

FIGS. 14A and 14B illustrate an image processing system according to a fourth exemplary embodiment of the present invention.

FIG. 15 illustrates an image processing system according to a modification of the fourth exemplary embodiment of the present invention.

FIG. 16 illustrates an edge enhancement filter.

FIG. 17 illustrates an image processing system according to a fifth exemplary embodiment of the present invention.

DESCRIPTION OF THE EMBODIMENTS

Various exemplary embodiments, features, and aspects of the invention will be described in detail below with reference to the drawings.

First, an optical transfer characteristic will be described, before exemplary embodiments of the present invention are described. An optical transfer characteristic is a characteristic relating to imaging of an optical system (imaging characteristic). Examples of optical transfer characteristics include a point spread function (hereinafter referred to as "PSF"), an optical transfer function (hereinafter referred to as "OTF"), an aberration (for example, a wave-front aberration), and a pupil function.

In exemplary embodiments of the present invention, an optical transfer characteristic filter (restoration filter) for use in image restoration processing is also defined as one of optical transfer characteristics reflecting an imaging characteristic. Now, exemplary embodiments for carrying out the present invention will be described in detail with reference to the accompanying drawings.

Figure 1:
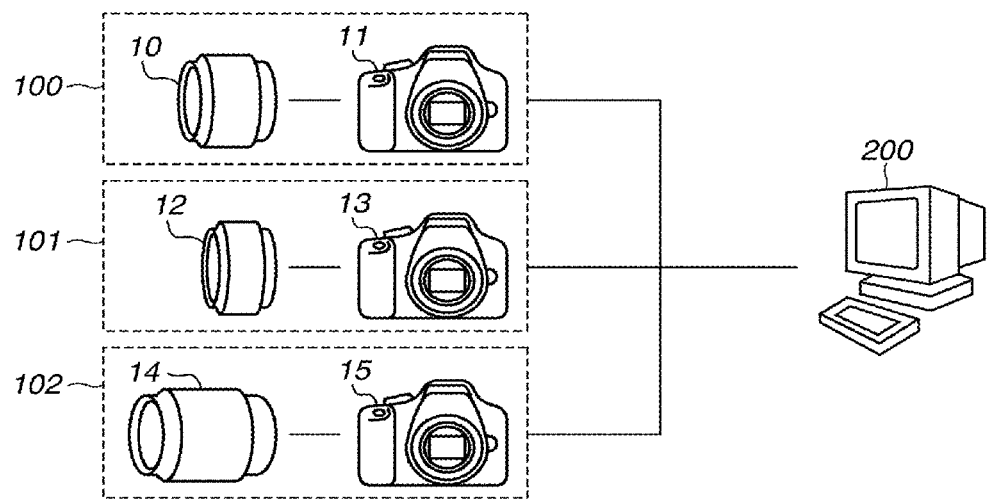
FIG. 1 schematically illustrates a configuration of an image processing system.

FIG. 1 schematically illustrates a configuration of an image processing system including an information processing apparatus in which a program stored in a recording medium according to an exemplary embodiment of the present invention is installed, and imaging apparatuses connectable (communicable) to the information processing apparatus.

Imaging optical systems 10, 12, and 14 form images of objects on image sensors (light-receiving elements), such as a Charge Coupled Device (CCD) image sensor or a Complementary Metal Oxide Semiconductor (CMOS) image sensor, of imaging apparatuses 11, 13, and 15. Each of the image sensors may be embodied by any element capable of converting an optical image according to a transfer characteristic of an optical system or any system equivalent thereto into an image.

Each of the imaging optical systems 10, 12, and 14 may be embodied by an imaging lens configured integrally with the main body of the camera (the main body of the imaging apparatus), or an interchangeable lens detachably attached to the main body of the camera, but the first exemplary embodiment (FIG. 1) employs interchangeable lenses as the imaging optical systems 10, 12, and 14.

In the first exemplary embodiment, combinations of the imaging optical systems 10, 12, and 14, and the imaging apparatus main bodies 11, 13, and 15 constitute imaging apparatuses 100, 101, and 102, respectively. The information processing apparatus 200 can transmit and receive data such as an image to and from the imaging apparatuses 100, 101, and 102. The information processing apparatus 200 performs image restoration processing on a received (acquired) image to generate a restored image.

Next, the configuration of the imaging apparatuses 100, 101, and 102 will be briefly described with reference to FIG. 2. The arrows illustrated in FIG. 2 indicate a path through which most of information is transferred. The imaging optical system 10 includes a diaphragm 10a and a focus lens 10b, and functions to form an image (optical image) of an object on the image sensor. An image sensor 202 (photoelectric conversion element or light-receiving element) is, for example, a CCD sensor or a CMOS sensor which converts an image of an object into an electric signal. An image in the form of an analog signal output from the image sensor 202 is converted into an image in the form of a digital signal by an analog/digital (A/D) convertor 203.

An image processing unit 204 performs image processing such as a correction of coloring in an image converted by the A/D convertor 203 and a reduction of blur therein. A display unit 205 is, for example, a liquid crystal display or an organic light emitting (EL) display, and can display an image processed by the image processing unit 204, or an image recorded in a storage unit 208 or an image recording medium 209.

An imaging optical system control unit 206 is, for example, an automatic focus mechanism or a manually-operated manual focus mechanism for a focus adjustment according to a distance to an object (object distance), and controls the diaphragm 10a and the focus lens 10b of the imaging optical system 10.

A state detection unit 207 detects imaging conditions (imaging states) such as an F-number (diaphragm diameter), a focal length (zoom position), and an object distance. A system controller 210 controls the whole system of this imaging apparatus 100, 101, or 102, and also controls a conversion of an image written in the storage unit 208 into a file, and recording of the generated file into the image recording medium 209.

Figure 3:
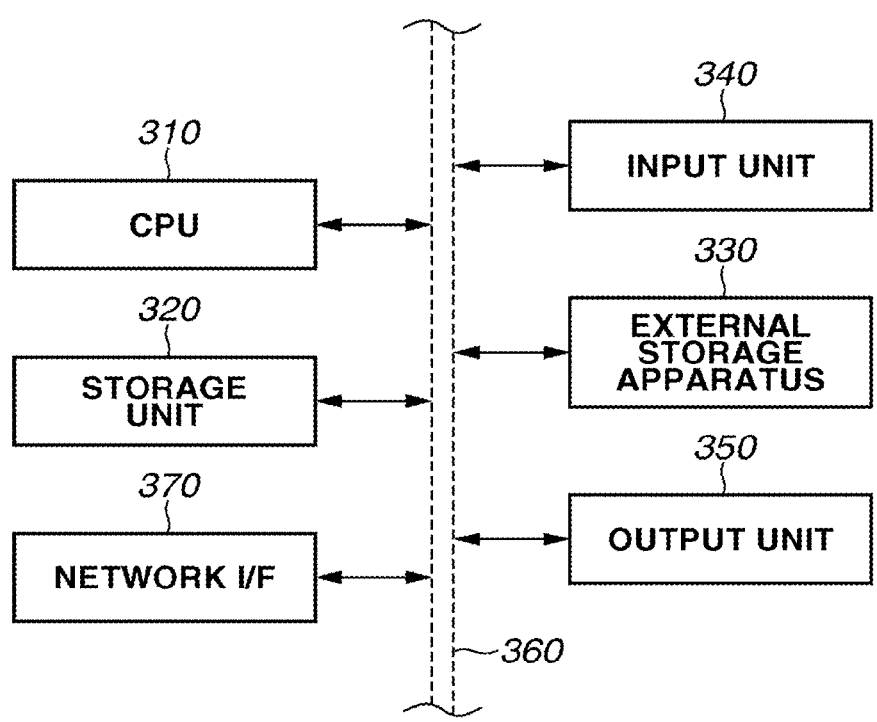
FIG. 3 schematically illustrates a configuration of an information processing apparatus.

Next, the configuration of the information processing apparatus 200 illustrated in FIG. 1 will be described with reference to FIG. 3.

A central processing unit (CPU) 310 of the information processing apparatus 200 controls the whole information processing apparatus 200 and performs image processing according to instructions of a program stored in, for example, a read only memory (ROM). A storage unit 320 stores various kinds of data such as images and optical transfer characteristics. The CPU 310 reads or writes data from and into the storage unit 320 as necessary.

An input unit 340 is, for example, a keyboard and/or a mouse, and is a unit allowing a user to provide information and an instruction to, for example, a program that is ready for accepting an input from the outside. An output unit 350 is, for example, a monitor or a display, and displays an image after image processing as necessary. The CPU 310, the storage unit 320, the input unit 340, and the output unit 350 are connected to one another through a bus 360.

The information processing apparatus 200 may be configured in such a manner that a program for carrying out the present exemplary embodiment, which is provided through a recording medium such as a Digital Versatile Disc-Recordable (DVD-R) or a Compact Disc-Recordable (CD-R), is stored in the storage unit 320, and the CPU 310 causes the information processing apparatus 200 to perform image processing according to an instruction of the stored program in response to an instruction of an operator. Alternatively, the information processing apparatus 200 may operate in such a manner that the CPU 310 performs image processing while a network interface (I/F) 370 connected to the bus 360 provides and receives, for example, a program and data by communicating with, for example, an information processing apparatus that is remotely located.

The imaging apparatuses 100, 101, and 102, and the information processing apparatus 200 have been described so far respectively. Next, the overall processing of the image processing system illustrated in FIG. 1 will be described with reference to FIG. 4.

The imaging apparatuses 100 and 101 that are communicable with the information processing apparatus 200 are imaging apparatuses each including a positive-lead type imaging optical system (lens), while the imaging apparatus 102 is an imaging apparatus including a negative-lead type imaging optical system.

First, the information processing apparatus 200 acquires an image 110 (first image) captured by the imaging apparatus 100, and identification information 120 allowing identification of an optical transfer characteristic filter (restoration optical transfer characteristic) which will be used during later image restoration processing. The identification information is, for example, Exchangeable Image File Format (EXIF) information, i.e., information indicating imaging conditions including, for example, a focal length and an F-number of an imaging optical system, and the identification code of an imaging apparatus (including an indication as to whether an imaging apparatus is different).

Then, the CPU 310 of the information processing apparatus 200 acquires an optical transfer characteristic filter No. 1 identified based on the identification information 120, and generates a restored image 110R (not illustrated) of the image 110 by performing two-dimensional convolution operation processing of the image 110 and the optical transfer characteristic filter No. 1. The details of this image restoration processing will be described later.

The restored image 110R is generated by the above-described processing, and the CPU 310 may apply signal processing to the restored image 110R and output the image after the signal processing to the output unit 350 as an output image. Examples of kinds of this signal processing include demosaicing, a white balance adjustment, edge enhancement processing, noise reduction processing, a distortion correction for performing a geometric aberration correction, a correction of a magnification chromatic aberration, and a shading correction.

Next, the imaging apparatus 101 and the information processing apparatus 200 will be described. The CPU 310 acquires an image 111 (second image) captured by the imaging apparatus 101 and identification information 121 in the same manner as the processing as the imaging apparatus 100.

Then, the CPU 310 of the information processing apparatus 200 acquires an optical transfer characteristic filter No. 1 identified based on the identification information 121, and generates a restored image 111R (not illustrated) of the image 111 by performing two-dimensional convolution operation processing of the image 111 and the optical transfer characteristic filter No. 1.

According to conventional known techniques, a storage unit stores optical transfer characteristic filters FA and FB respectively corresponding to imaging apparatuses A and B to restore images captured by the imaging apparatuses A and B.

On the other hand, according to the first exemplary embodiment, the storage unit 320 stores the optical transfer characteristic filter No. 1 (first optical transfer characteristic) commonly usable for the images 110 and 111 captured by the imaging apparatuses 100 and 101. Therefore, it is possible to reduce a data storage capacity required for image restoration.

Figure 5A:
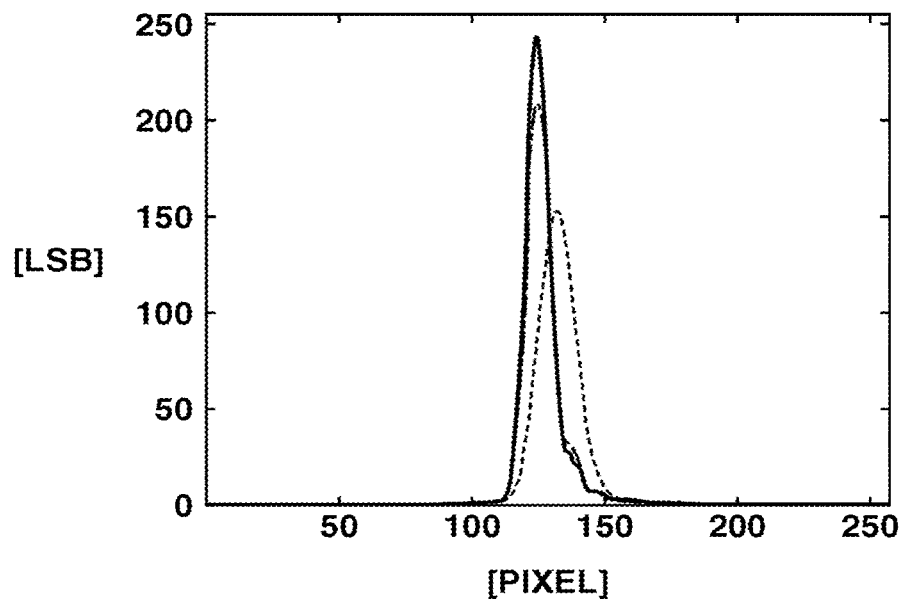
FIGS. 5A and 5B each illustrate an optical transfer characteristic.
Figure 5B:
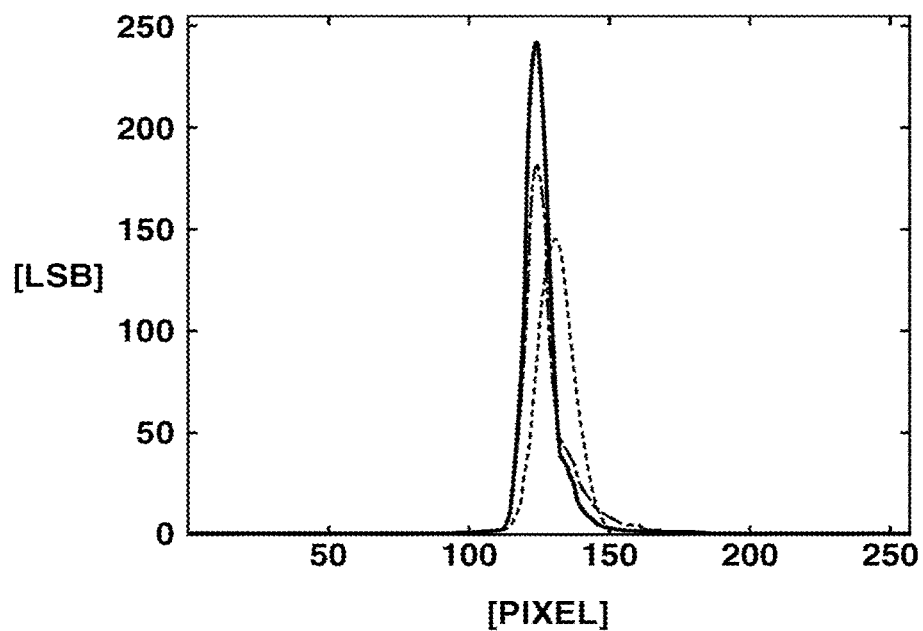

The inventor of the present invention has discovered through optical designing that similarly configured imaging apparatuses, like apparatuses of similar lens types or apparatuses of similar focus types, show similar optical transfer characteristics under same imaging conditions. For example, FIGS. 5A and 5B illustrate point spread functions of the imaging apparatuses 100 and 101, which are both positive-lead type apparatuses, showing similar characteristics.

Even if imaging conditions are not the same, imaging apparatuses of a same zoom type show similar optical transfer characteristics. One example of such a pair is imaging optical systems of a same zoom type that have a same focal length at their wide-angle ends but different zoom ratios. Such imaging apparatuses show similar optical transfer characteristics even if imaging conditions at their telephoto ends are different from each other.

In other words, the technique according to the first exemplary embodiment has been contrived by focusing on this similarity in optical transfer characteristics, and acquires identification information allowing identification of an optical transfer characteristic for restoring an image.

After that, the first exemplary embodiment acquires the optical transfer characteristic identified based on the identification information from the storage unit storing the first optical transfer characteristic commonly usable for the first and second captured images captured under different imaging conditions, and the second optical transfer characteristic usable for the third capture image.

Then, the first exemplary embodiment causes the information processing apparatus 200 to execute the restoration process of generating a restored image with use of the optical transfer characteristic acquired in the above-described characteristic acquisition process. The first exemplary embodiment enables a reduction in the data storage capacity while maintaining the quality of a restored image, compared to a configuration that stores separate optical transfer characteristic filters corresponding to respective individual imaging apparatuses.

Further, the storage unit 320 can store optical transfer filters patterned (categorized and assigned) for each type such as a zoom type, a focus type, and an image stabilization type. Due to this arrangement, even when connecting the imaging apparatus 102, which is a negative-lead type apparatus, to the information processing apparatus 200 (establishing communication between the imaging apparatus 102 and the information processing apparatus 200), additional provision of a new optical transfer filter is not required.

The focus type is, for example, an indication whether an apparatus is of the rear focus type or of the front focus type. Patterning optical transfer filters for each focus type means storing a single filter group corresponding to a plurality of different imaging apparatuses in a storage unit, since even different imaging apparatuses often show similar optical transfer characteristics as long as they are of a same focus type.

The foregoing also applies to imaging optical systems. How to pattern optical transfer filters is not limited to the above-described method, and optical transfer filters may be patterned based on a lead type, like whether an imaging optical system is of the negative-lead type or of the positive-lead type.

Next, the processing that the information processing apparatus 200 performs on the image 112 (third image) captured by the negative-lead type imaging apparatus 102 will be described.

The CPU 310 acquires the image 112 captured by the imaging apparatus 102 and identification information 122. Then, the CPU 310 of the information processing apparatus 200 acquires an optical transfer characteristic filter No. 2 (second optical transfer characteristic) identified based on the identification information 122. After that, the CPU 310 generates a restored image 112R (not illustrated) of the image 112 by performing two-dimensional convolution operation processing of the image 112 and the optical transfer characteristic filter No. 2.

The optical transfer characteristic filter No. 2 (second optical transfer characteristic) is a different filter (optical transfer characteristic) from the optical transfer characteristic filter No. 1 (first optical transfer characteristic).

Further, more effective image restoration can be realized by designing the imaging apparatuses 100, 101, and 102 in such a manner that the optical transfer characteristics of the imaging apparatuses 100, 101, and 102 approach the optical transfer characteristics stored in advance.

Although the present exemplary embodiment and the other exemplary embodiments that will be described below are described based on a configuration acquiring a single optical transfer characteristic filter for a single image for simplification of description, a group (set) constituted by a plurality of optical transfer characteristic filters may be used for a single image.

If a group constituted by a plurality of optical transfer characteristic filters is used for a single image, the present exemplary embodiment can be carried out by the CPU 310 acquiring, for example, a group of optical transfer characteristic filters commonly usable for the imaging apparatuses 100 and 101.

Further, if a plurality of optical transfer characteristic filters is used for a single image, the CPU 310 may acquire an optical transfer characteristic filter for each pixel in an image. If the CPU 310 acquires an optical transfer characteristic filter for each pixel, the CPU 310 may extract one or more predetermined pixel(s) and acquire an optical transfer characteristic filter(s) corresponding to the extracted pixel (s). In this case, the processing speed can be increased compared to respectively acquiring optical transfer characteristic filters for all pixels.

Further, lenses of a same type show similar tendencies about how an aberration occurs at each pixel position under a same imaging condition. For example, a curvature of field occurs at the wide-angle end of a negative-lead zoom lens, and a large axial chromatic aberration occurs at the telephoto end of a positive-lead zoom lens, which is used as a high power zoom lens.

In this way, lenses of a same type mostly have similar deterioration characteristics at each pixel position in an image, which allows preparation of a set (group) of optical transfer characteristic filters (restoration filters) for the respective pixel positions to be commonly used for lenses of a same type. In this case, since it is unnecessary to acquire a filter for each pixel position, the processing can be sped up.

Further, the storage unit 320 may store or may not store optical transfer characteristic filters before execution of the program.

In the latter case, the present exemplary embodiment can be carried out, for example, in such a manner that an optical transfer characteristic filter commonly usable for a plurality of imaging apparatuses is stored in a recording medium containing the program, and then, this optical transfer characteristic filter is stored in an external storage apparatus of an information processing apparatus or an image processing apparatus to which the program is installed.

Further, the first exemplary embodiment has been described above based on a configuration in which optical transfer characteristics are stored in the storage unit 320 as they are. However, for example, point spread functions or optical transfer functions may be stored in the storage unit 320. In such a case, the first exemplary embodiment can be carried out by the CPU 310 applying a Fourier transform or a reverse Fourier transform to a point spread function or an optical transfer function to generate an optical transfer characteristic filter.

In the exemplary embodiments of the present invention, the term "restoration filter" is used for the same meaning as the term "optical transfer characteristic filter", and as understood, the optical transfer characteristic includes the restoration filter.

Figure 6:
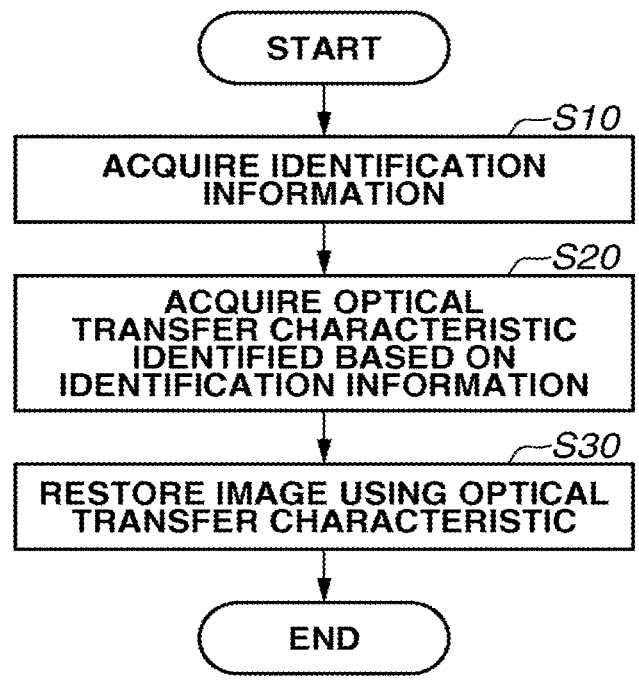
FIG. 6 is a flowchart illustrating an image processing procedure.

Next, the processing flow of the program that the CPU 310 causes the information processing apparatus 200 to execute will be described with reference to FIG. 6.

First, in step S10 (identification information acquisition process), the CPU 310 acquires an image and identification information for identifying an optical transfer characteristic filter. Subsequently, in step S20 (optical transfer characteristic acquisition process), the CPU 310 acquires an optical transfer characteristic filter (optical transfer characteristic) identified based on the identification information.

Subsequently, in step S30 (restoration process), the CPU 310 convolutes the optical transfer characteristic filer to the image acquired in step S10 in a real space.

The CPU 310 does not necessarily have to acquire the image to be restored in step S10, and may acquire the image to be restored in step S30 or any step before step S30.

The step of performing the above-described signal processing has to be performed only when necessary, so that the signal processing step has been not especially described in the above description.

Further, the first exemplary embodiment has been described above based on a configuration in which the CPU 310 of the information processing apparatus 200 executes the respective steps according to the instruction of the program. However, the effects of the present exemplary embodiment can be also acquired by realizing the respective steps or a part thereof by means of hardware.

Figure 7:
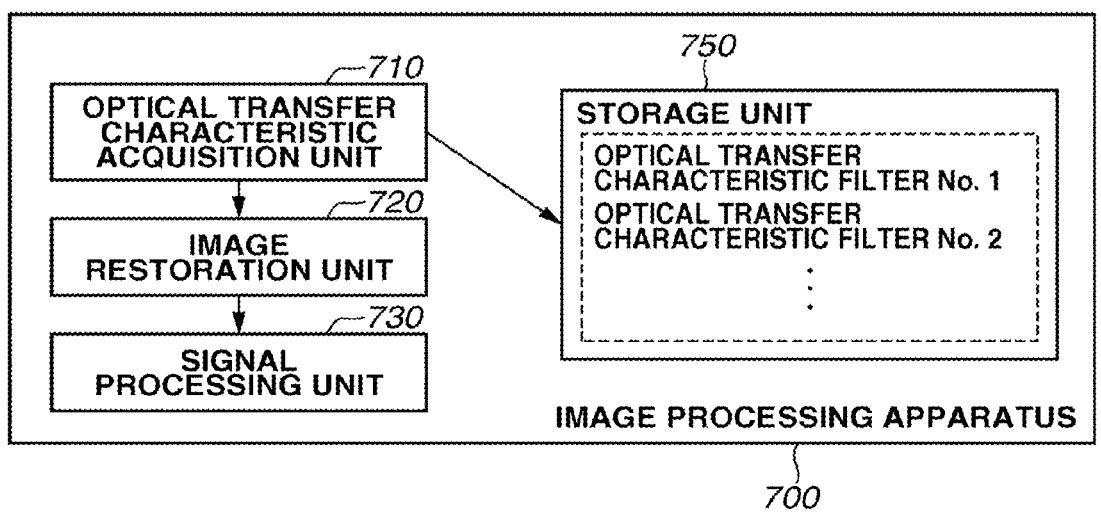
FIG. 7 schematically illustrates an image processing apparatus.

FIG. 7 schematically illustrates a configuration in which the respective steps are realized by hardware as an image processing apparatus by way of example. Imaging apparatuses communicable to the image processing apparatus 700 are similar to those illustrated in FIG. 4, and therefore the description thereof will be omitted here to avoid redundancy.

The image processing apparatus 700 includes an optical transfer characteristic acquisition unit 710, an image restoration unit 720, a signal processing unit 730, and a storage unit 750.

First, the image processing apparatus 700 acquires an image to be restored and identification information allowing identification of an optical transfer characteristic filter. The optical transfer characteristic acquisition unit 710 acquires an optical transfer characteristic filter identified based on the identification information from the storage unit 750.

The image restoration unit 720 generates a restored image by convoluting the acquired optical transfer characteristic filter and the image. The signal processing unit 730 performs image processing such as demosaicing on the restored image. As a result of the operations of the above-described respective units, a desired restored image can be acquired.

As another example of use of the above-described image processing system, instead of the CPU 310 of the information processing apparatus 200, an arithmetic processing unit mounted on a printer can be utilized to achieve image restoration processing during a printing operation.

As described above, the inventor of the present invention has paid attention to the fact that, if imaging apparatuses are of a same type, they also have similarity in their optical transfer characteristics (show similar imaging characteristics). According to the exemplary embodiments of the present invention contrived based on this idea, it is possible to acquire a high-quality restored image while reducing a data storage capacity by storing an optical transfer characteristic (representative optical transfer characteristic) representative of similar optical transfer characteristics in a storage unit in advance, and using this optical transfer characteristic to restore an image.

The identification information may be any information allowing identification of an optical transfer characteristic for use in restoration processing, and therefore the identification information may be an imaging condition itself, or a part thereof.

Examples of contents of the imaging condition include a focal length, an F-number, an object distance, an image height, information allowing identification of an imaging apparatus, information allowing identification of an optical system, a zoom position, a focus state to an object distance, a diaphragm state, a lens position of an image stabilization lens, the number of lenses in a lens group, and information about a lens structure.

Further, since an aperture characteristic also varies depending on pixels of an image sensor of an imaging apparatus, this information about an image sensor may be used as the identification information. Alternatively, if a different low-pass filter is used for each imaging apparatus, this information can be also used as the identification information allowing identification of an optical transfer characteristic.

Further, in the first exemplary embodiment, the imaging apparatuses 100, 101, and 102 directly output the identification information for identifying the optical transfer characteristics thereof. However, the CPU 310 may generate information useful for identifying an optical transfer characteristic from the information of the imaging apparatuses 100, 101, and 102 or the information of the imaging condition itself, and use it as the identification information.

In this case, the identification information may be generated by the imaging apparatus side or may be generated by the image processing apparatus side. Further, the identification information may be added to a part of an image or may be acquired through another device or a network.

Further, the first exemplary embodiment has been described based on a method in which the CPU 310 acquires the optical transfer characteristic filter identified based on the identification information from the optical transfer characteristic filters stored in the storage unit 320. However, it is not limited thereto.

For example, a lookup table (LUT), which contains the corresponding relationship between the identification information and the address of the optical transfer characteristic filter stored in the storage unit 320, may be stored in the storage unit 320. Then, the CPU 310 may refer to the lookup table, and acquire the optical transfer characteristic filter corresponding to the identification information. In other words, the identification information in the exemplary embodiments of the present invention may be information directly indicating an optical transfer characteristic or information indirectly indicating an optical transfer characteristic.

Further, the first exemplary embodiment has been described based on an example including an imaging optical system and the main body of an imaging apparatus which are prepared as separate bodies. However, an imaging apparatus may be an apparatus including a lens and an image sensor which are integrally configured, such as a compact camera.

Further, the first exemplary embodiment has been described based on an example in which the CPU 310 of the information processing apparatus 200 performs all of the steps. However, the effects of the first exemplary embodiment can be acquired even if the CPUs of the imaging apparatuses 100, 101, and 102 and the CPU 310 of the information processing apparatus 200 perform a part of the steps, respectively. In other words, the effects of the present exemplary embodiment can be acquired by any image processing system that performs image restoration processing based on identification information and images output from a plurality of imaging apparatuses.

Now, an image (image data) handled by the exemplary embodiments of the present invention will be briefly described. An image handled by the exemplary embodiments of the present invention includes, for example, Red/Green/Blue (RGB) color components or a plurality of components expressed by a color space. Examples of components expressed by a color space include luminance, hue, and chroma expressed by Luminance Chrominance Hue (LCH), and luminance and color-difference signals expressed by Luminance/Chroma Blue/Chroma Red (YCbCr).

An image may be a mosaic image having a signal value of one color component for each pixel, or a de-mosaiced image having signal values of a plurality of color components for each pixel after color interpolation processing (de-mosaicing processing) is applied to a mosaic image.

Such a mosaic image is also called a RAW image as an image before application of various kinds of image processing such as color interpolation processing (de-mosaicing processing), a signal value conversion called a gamma conversion, and image compression known as Joint Photographic Experts Group (JPEG).

Especially, if an imaging apparatus uses an image sensor constituted by a single sensor to acquire information of a plurality of color components, a color filter having a different degree of spectral transmittance is disposed at each pixel to acquire a mosaic image having a signal value of one color component for each pixel as described above. In this case, execution of the above-described color interpolation processing can generate an image having signal values of a plurality of color components for each pixel.

On the other hand, if an imaging apparatus uses image sensors of multiple sensors, for example, three sensors, a color filter having a different degree of spectral transmittance is disposed on each of the image sensors to acquire image signal values of different color components at the respective image sensors. In this case, pixels corresponding to one another among the image sensors respectively have signal values of respective color components so as to be able to generate an image having signal values of a plurality of color components for each pixel without especially requiring execution of color interpolation processing.

Further, an image can have an addition of an imaging condition such as a focal length of a lens, a diaphragm, and an object distance. If a series of processes from imaging to outputting is performed within a single closed imaging apparatus, an imaging condition can be acquired within the apparatus without requiring an image to have the imaging condition attached thereto.

Figure 2:
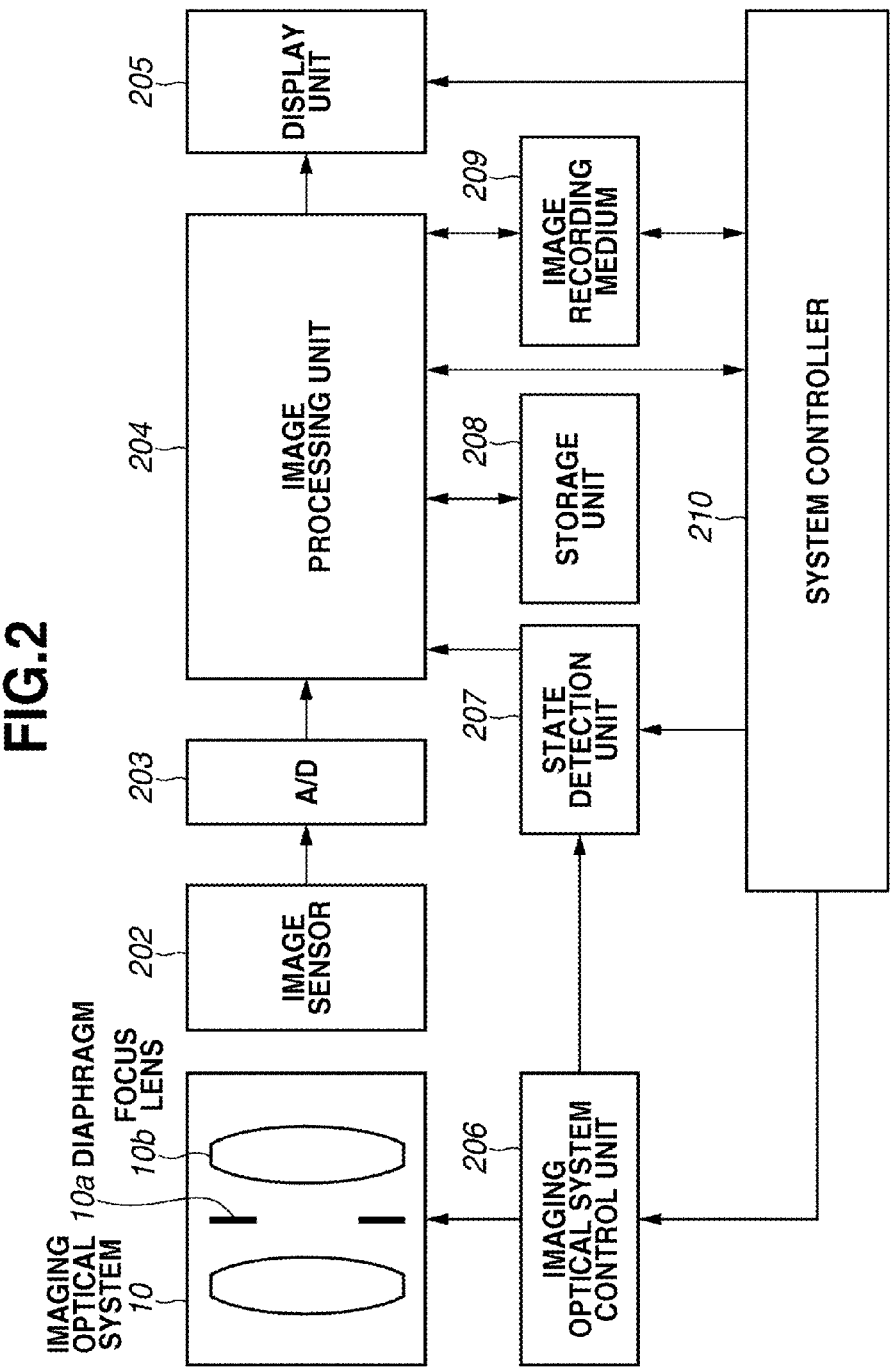
FIG. 2 schematically illustrates a configuration of an imaging apparatus.

In this case, identification information can be acquired from, for example, the state detection unit 207 (FIG. 2). However, it may be effective that imaging condition information is attached to an image, if a separate image processing apparatus or information processing apparatus acquires a RAW image from an imaging apparatus and then performs desired image processing and signal processing.

Next, an overview of the above-described image restoration processing will be described. Image restoration is processing of reducing an aberration that occurs in an image, and an aberration is, for example, a spherical aberration, a coma aberration, a curvature of field, and an astigmatism of an imaging optical system.

Occurrence of these aberrations results in formation of an image (point image) as a spread blurred point on an image sensor (light receiving element), although actually, a point image has to be formed as one point. This blur caused by an aberration is optically expressed by a point spread function (PSF).

Assuming that $f(x, y)$ is an original image, $g(x, y)$ is a captured image (deteriorated image), and $h(x, y)$ is a point spread function (PSF), the following expression is established. In this equation, * indicates a convolution operation, and $(x, y)$ represents coordinates on an image.

$$g(x,y)=h(x,y)*f(x,y) \qquad \text{(EQUATION 1)}$$

In the first exemplary embodiment, the original image $f(x, y)$ and the captured image $g(x, y)$ correspond to a restored image and an image output from an imaging apparatus, respectively.

When a Fourier transform is applied to the equation 1 to convert the equation 1 into an expression in a frequency space, the right side of the equation 1 becomes a product of the respective frequencies, as expressed by the following equation (2).

$$G(u,v)=H(u,v)\cdot F(u,v) \qquad \text{(EQUATION 2)}$$

In this equation 2, $H(u, v)$ is a result of application of a Fourier transform to the point spread function $h(x, y)$. In other words, $H(u, v)$ is an optical transfer function (OTF). Further, $G(u, v)$ and $F(u, v)$ are results of application of a Fourier transform to $g(x, y)$ and $f(x, y)$, respectively. Further, $(u, v)$ is coordinates in a two-dimensional frequency space, i.e., a frequency. Further, the mark "·" indicates a multiplication operation.

The restored image $F(u, v)$ can be acquired from the captured image $G(u, v)$ by dividing the both sides of the equation 2 by H.

$$G(u,v)/H(u,v)=F(u,v) \qquad \text{(EQUATION 3)}$$

The restored image $f(x, y)$ can be acquired by applying a reverse Fourier transform to this $F(u, v)$, i.e., $G(u, v)/H(u, v)$ to return it to an expression in a real space (real surface).

Then, assuming that R(x, y) is a result of application of a reverse Fourier transform to 1/H(u, v), the equation 3 can be converted into the following equation 4.

$$g(x,y)*R(x,y)=f(x,y) \quad \text{(EQUATION 4)}$$

In other words, a restored image can be acquired by convoluting R(x, y) to a captured image in the real space as expressed by the equation 4.

This R(x, y) is a restoration filter (optical transfer characteristic filter). Generally, for a two-dimensional image, this restoration filter is a two-dimensional filter having taps (cells) corresponding to the respective pixels in an image, as illustrated in FIG. 8A.

Further, generally, increasing the number of taps in a restoration filter can improve the restoration accuracy, so that any feasible number can be set as the number of taps according to, for example, a required image quality, an image processing capacity, and aberration characteristics. This restoration filter, which should reflect aberration characteristics, has a different nature from, for example, a conventional edge enhancement filter (high-pass filter) having about 9 taps arranged in 3 columns and 3 rows.

Figure 8A:
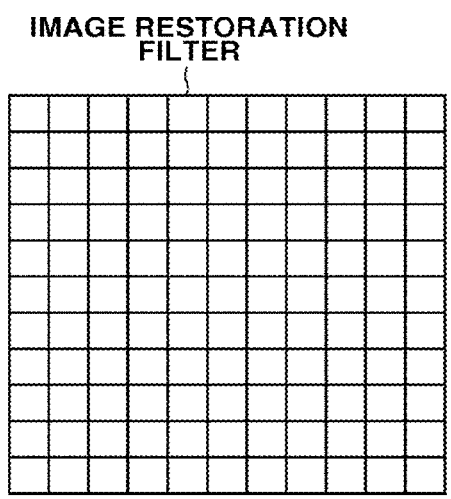
FIGS. 8A and 8B illustrate an optical transfer characteristic filter (restoration filter).
Figure 8B:
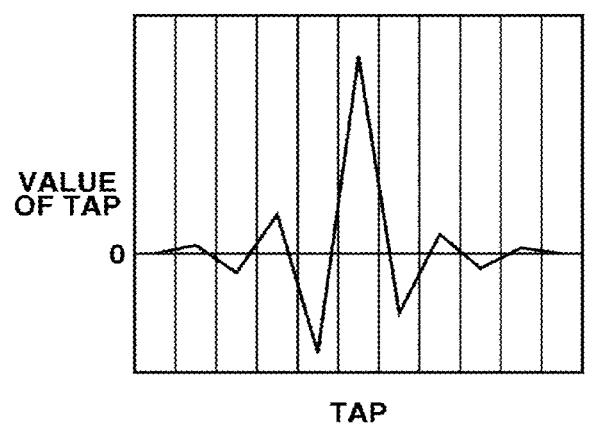

FIG. 8B is a cross-sectional view of the restoration filter illustrated in FIG. 8A. In this graph, the horizontal axis indicates taps, and the vertical axis indicates the values of taps. The distribution of the values (coefficient values) of the respective taps functions to return signal values that spatially spread due to an aberration to an original one point.

Examples of methods for generating this restoration filter include a method of calculating or measuring an optical transfer function (OTF) of an imaging optical system, and then acquiring a restoration filter thereof by applying a reverse Fourier transform to the function based on the inverse function of the calculated or measured optical transfer function.

An optical transfer characteristic can include not only factors related to an imaging optical system but also other factors that may affect the optical transfer characteristic during an imaging operation. Examples of such factors include the characteristic of an optical low-pass filter having a birefringence, the aperture shape of an image sensor of a light source, and spectral characteristics of various kinds of wavelength filters.

An optical low-pass filter having a birefringence suppresses a high frequency component in terms of the frequency characteristic of an optical transfer characteristic, and an image sensor is also one of factors that affect a transfer characteristic since the inclination thereof changes a blurred image formed on the image sensor. It is more desirable to perform image restoration processing based on a comprehensive optical transfer characteristic including these factors.

Further, an advantage of convoluting a restoration filter to an image in the real space is that this can further speed up the processing due to the unnecessity of execution of a Fourier transform or a reverse Fourier transform on an image during the image restoration processing.

The filter illustrated in FIG. 8A is a squarely-arranged filter (the number of vertically arranged taps is the same as the number of horizontally arranged taps), but it is not limited thereto, and the number of vertically arranged taps and the number of horizontally arranges taps on a restoration filter can be arbitrarily changed.

An ideal restoration filter has been described with use of the equations, but an actual image includes a noise component, so that use of a restoration filter based on an inverse function of an optical transfer function (OTF) as described above results in an amplification of an noise component along with the restoration. A more complicated restoration filter such as a Wiener filter may be used to restrain an amplification of a noise component.

Aberrations to be restored during image restoration processing include, but not especially limited to, a spherical aberration, a coma aberration, an astigmatism, and a curvature of field among Seidel's aberrations (a spherical aberration, a coma aberration, an astigmatism, a curvature of field, and a distortion). Image restoration can exclude an aberration requiring a geometrically large correction amount such as a distortion from targets of image restoration processing. This is because a geometrically large correction amount often leads to a fluctuating change in the coefficient values of a restoration filter, thereby easily generating an unwelcome artifact such as ringing in a restored image Another advantageous effect from narrowing down targets to be restored by image restoration processing to a spherical aberration, a coma aberration, an astigmatism, and a curvature of field is that this can reduce the data amount than adding a component for correcting a distortion to a restoration filter which is two-dimensional data.

Since data required to correct a geometric distortion is only one-dimensional data indicating an expansion/contraction degree of an image, the data storage space can be reduced compared to wastefully adding a component for correcting a distortion to a restoration filter which is two-dimensional data.

This is especially effective for a system in which a specific image processing apparatus performs image restoration proceeding on an image having various kinds of aberrations, like the first exemplary embodiment.

Further, the above-described image restoration processing can be applied even to an apparatus without including an imaging optical system, for example, a scanner (reading apparatus), which images an object while the image sensor thereof closely contacting the surface of the object, and an X-ray imaging apparatus.

Such an apparatus does not have an imaging optical system such as a lens, but is subjected to an image deterioration more or less due to, for example, image sampling by an image sensor. This deterioration characteristic is a transfer characteristic (transfer function) of the apparatus, and therefore corresponds to the above-described optical transfer characteristic, although this deterioration characteristic is not derived from an imaging optical system. Accordingly, a restored image can be generated based on the transfer characteristic even though the apparatus does not have an imaging optical system.

Figure 9:
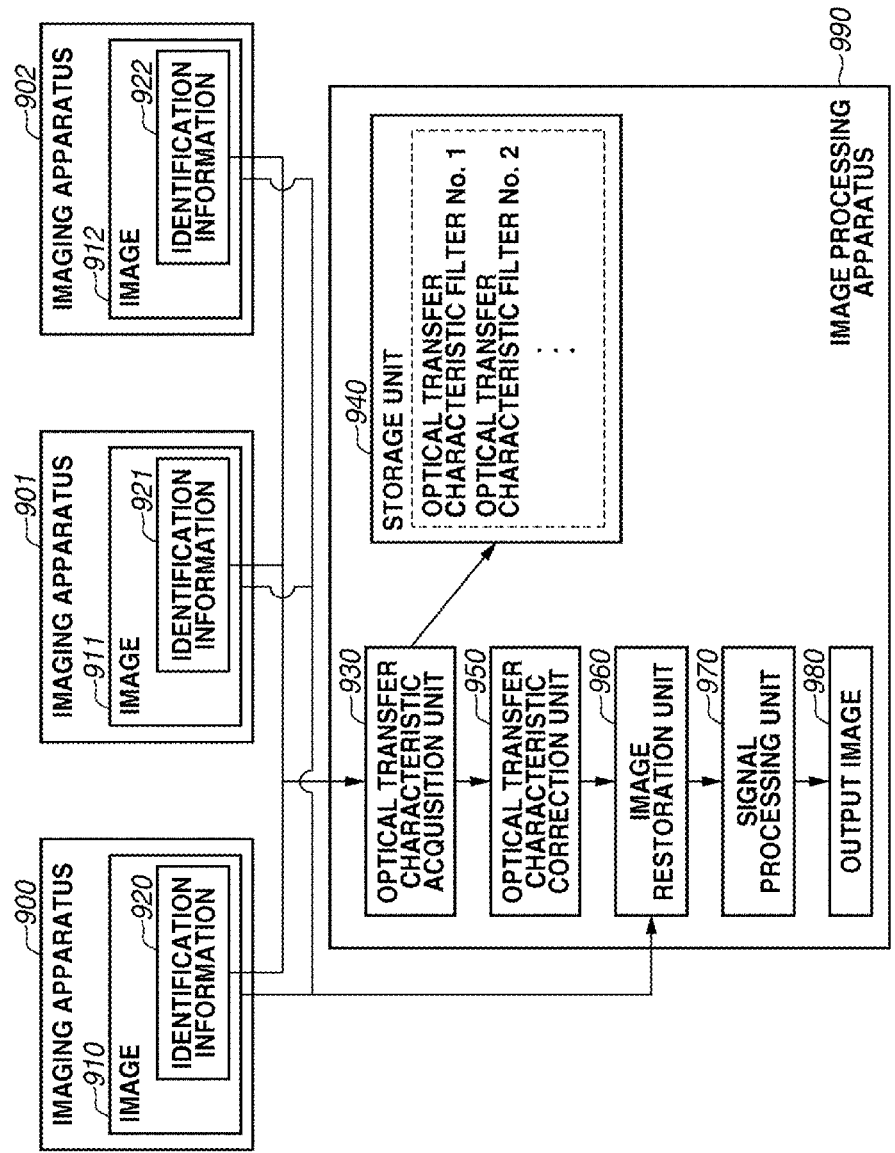
FIG. 9 illustrates an image processing system according to a first modification example of the first exemplary embodiment of the present invention.

A modification example of the first exemplary embodiment will be described with reference to FIG. 9. In the first modification, an optical transfer characteristic correction unit 950 generates a corrected restoration filter (corrected optical transfer characteristic) closer to an ideal restoration filter corresponding to an actual imaging condition by applying a calculation to an optical transfer characteristic filter acquired by an optical transfer characteristic acquisition unit 930.

The first modification example will be described assuming that a different unit is in charge of each process, unlike the first exemplary embodiment. However, a calculation unit in an image processing apparatus 990 may be in charge of the respective processes.

The optical transfer characteristic acquisition unit 930 selects a specific pixel from pixels in an image to perform an interpolation calculation for each pixel in the image captured by an imaging apparatus. At this time, the optical transfer characteristic acquisition unit 930 may select a plurality of pixels or a single pixel.

Further, the specific pixel may be acquired by determining a common pixel position among the respective imaging conditions, and selecting this pixel position as the specific pixel. Alternatively, the specific pixel may be acquired by selecting a different pixel position based on identification information such as EXIF information.

Then, the optical transfer characteristic acquisition unit 930 acquires an optical transfer characteristic filter (hereinafter referred to as "restoration filter") corresponding to the selected specific pixel. In this way, acquiring a restoration filter corresponding to the specific pixel can improve the processing speed compared to repeatedly applying the step of acquiring a restoration filter of each pixel to all pixels.

Then, the optical transfer characteristic correction unit 950 generates a restoration filter of an arbitrary pixel position by performing bilinear interpolation with use of the restoration filer acquired for each specific pixel. Use of the corrected restoration filter generated from the interpolation can improve the accuracy of the image restoration.

This is because, generally, a corrected restoration filter generated by interpolation is a restoration filter closer to an actual optical transfer characteristic than a restoration filter acquired for each specific pixel before the interpolation.

Then, the image restoration unit 960 generates a restored image by performing two-dimensional convolution (calculation) of the corrected restoration filter corrected by the optical transfer characteristic correction unit 950 and the image. A signal processing unit 970 performs various kinds of signal processing on the restored image, and then outputs an output image 980.

Execution of the above-described processing can improve the image restoration accuracy while reducing a data amount that should be stored in advance.

The first modification has been described as the processing of acquiring a restoration filter for a specific pixel in an image and generating corrected restoration filters for pixels between a first specific pixel and a second specific pixel as an interpolation calculation.

Generally, an image acquired through an optical system has an increasing degree of image deterioration (aberration) from the center of the image toward the periphery of the image. Especially, a large coma aberration, a large astigmatism, and a large curvature of field occur at the periphery of an image.

Therefore, the first modification prepares restoration filters of specific pixels more closely spreading at the periphery of an image than the center of the image, instead of preparing restoration filters of specific pixels evenly distributed in the image, as the restoration filters for use in the interpolation calculation. As a result, more accurate image restoration can be realized.

Approximately 5 to 60 restoration filters can be prepared for a quarter region of one screen. Preparing restoration filters less than this lower limit value cannot keep excellent image restoration accuracy, since this increases a difference between a corrected restoration filter after the calculation of the optical transfer characteristic correction unit 950, and an ideal restoration filter.

Further, preparing restoration filters more than the upper limit value slows down the processing speed, since this increases a calculation amount that the calculation unit should process (increases the number of times of acquiring restoration filters). In other words, a region having a large aberration (a region having a large change in the aberration amount) requires a larger number of restoration filters.

Therefore, the present modification prepares restoration filters, especially prioritizing filters corresponding to a point spread function indicating a large spread, as restoration filters stored in the storage area in advance. This arrangement can improve the restoration accuracy and processing speed of the image restoration.

In the above description, restoration filters for a quarter region of an image are prepared in consideration of the rotational symmetry (line symmetry) of an imaging optical system, but it is not limited thereto.

The above-described interpolation calculation may be any interpolation calculation such as linear interpolation, bilinear interpolation, and bicubic interpolation, besides the above-described interpolation calculation, according to the processing speed and the interpolation accuracy. Even an interpolation calculation determination unit may be provided to determine the type of interpolation calculation.

The type of interpolation calculation is determined in consideration of the balance between the accuracy of interpolation processing and the time required for the calculation. For example, if a priority is given to the accuracy of interpolation calculation, bicubic interpolation is selected. On the other hand, if a priority is give to the processing speed, bilinear interpolation is selected.

Further, the first modification has been described based on the interpolation calculation which acquires values of restoration filters for pixels between the first specific pixel and the second specific pixel by interpolation processing. However, the first modification may perform the interpolation calculation independently of pixel position. For example, the first modification may perform the interpolation calculation with respect to a focal length, an F-number, an object distance, and an image stabilization state (a shift and a tilt state of an image stabilization lens group).

For example, if the interpolation calculation is applied to a focal length, the image processing apparatus selects specific focal lengths from discrete focal lengths from the wide end to the tele end of the optical system. Then, the image processing apparatus acquires the optical transfer characteristics of the selected focal lengths. If the focal length in the imaging condition is included in those specific focal lengths, the image processing apparatus restores the image with use of the acquired optical transfer characteristic.

If the focal length in the imaging condition is not included in the specific focal lengths, the image processing apparatus generates an optical transfer function of the imaging focal length by interpolation with use of the optical transfer characteristic of a specific focal length located at the wide side or tele side thereof. Then, the image processing apparatus restores the image with use of the generated optical transfer function.

This is interpolation with respect to one axis of focal length. However, the optical transfer characteristic of arbitrary coordinates may be generated by using the optical transfer characteristic of specific coordinates in a space where respective axes represent discrete focal lengths, F-numbers, object distances, and image stabilization states.

For example, in a three-dimensional space (focal lengths, F-numbers, and object distances), the optical transfer characteristic of arbitrary coordinates can be generated by performing plane interpolation with use of the optical transfer characteristics of specific coordinates surrounding the arbitrary coordinates.

Further, other than the interpolation calculation, there is a calculation of correcting each restoration filter acquired by the optical transfer characteristic acquisition unit 930 as another example of calculation that the optical transfer characteristic correction unit 950 applies to a restoration filter.

Examples of kinds of this correction calculation include a calculation of proportionally multiplying the value of a restoration filter.

This calculation can change the luminance level of an image restored by a restoration filter, so as to be useful, for example, when white balance is desired to be adjusted.

Further, as another example of the calculation, the optical transfer characteristic correction unit 950 can generate a restoration filter having a combination of effects of two restoration filters by convoluting another restoration filter to a restoration filter acquired by the optical transfer characteristic acquisition unit 930.

Further, still another example of the calculation is a functionalization calculation to acquire a corrected restoration filter by using restoration filters corresponding to specific pixels. The functionalization calculation uses restoration filters of discrete pixel positions and calculates a coefficient of a function in which the pixel position is set as a variable by the fitting method.

A restoration filter for an arbitrary pixel position can be generated by substituting the arbitrary pixel position in this function. According to this calculation, once the function is generated, a restoration filter can be generated by only substituting a target position for the variable thereafter, so that this calculation is useful to reduce the processing time.

This functionalization calculation will be described more specifically. The optical transfer characteristic correction unit 950 performs the functionalization calculation with each pixel position set as a variable, based on restoration filters acquired by the optical transfer characteristic acquisition unit 930. First, the optical transfer characteristic acquisition unit 930 acquires restoration filters corresponding to a plurality of pixel positions. To select this plurality of pixel positions, pixel positions common among respective imaging conditions may be determined, or pixel positions may be changed based on the identification information.

A restoration filter is acquired for each determined pixel position, and these acquired restoration filters are fitted to a model function in which a pixel position is set as a variable. Hereinafter, this model function is referred to as "fitting function". The restoration filter for an arbitrary pixel position can be generated by substituting this arbitrary pixel position in this function.

The restoration filter fitted at the arbitrary pixel position is closer to an actual restoration filter than a restoration filter closest to the pixel position among the discrete restoration filters stored in the storage area in advance. As a result, the accuracy can be improved for the image restoration processing.

Use of the fitting function allows a restoration filter for each pixel to be determined by just substituting the pixel position in the function, therefore it becomes possible to speed up image restoration processing even when, for example, a CPU does not have a high processing capability. Further, this processing can be applied to a focal length, an object distance, an F-number, and the position of an image stabilization lens.

The above-described calculations are just an example, and the calculation according to the present modification can be embodied by any calculation as long as the calculation can adjust a restoration filter acquired by the optical transfer characteristic acquisition unit 930 to make the restoration filter closer to an ideal restoration filter or the calculation can improve the processing speed.

Next, a second exemplary embodiment will be described with reference to FIG. 10. The second exemplary embodiment is such an embodiment that a series of processes are performed within an imaging apparatus. Differences from the first exemplary embodiment are that, in the second exemplary embodiment, identification information is information for allowing identification of a focus type, and a suitable optical transfer characteristic filter is stored for each focus type in the storage unit.

An imaging optical system mounted on an imaging apparatus in the second exemplary embodiment is a negative-lead type and rear focus type lens (first imaging optical system) (not illustrated). A storage unit 208 of the imaging apparatus stores an optical transfer characteristic filter group No. 1 (third optical transfer characteristic) so that a restored image can be efficiently generated even when a different negative-lead type and rear focus type lens (second imaging optical system) is mounted onto the imaging apparatus.

In addition, the storage unit 208 stores an optical transfer characteristic filter group No. 2 corresponding to a plurality of negative-lead type and front focus type lenses (third imaging optical system). These optical transfer characteristic filter groups No. 1 and No. 2 each are a filter group containing a plurality of filters as one set.

It is difficult to hold a large number of filters, since a filter is two-dimensional data. Although it is obvious that holding a large number of filters can improve the restoration accuracy, some measure is required to efficiently store filters in a limited memory capacity of, for example, an imaging apparatus.

Under these circumstances, the inventor of the present invention has discovered through various optical designs that lenses of a same focus type have similar optical transfer characteristics, and as is the case with the first exemplary embodiment, the inventor has utilized this knowledge to invent an imaging apparatus that uses a same filter for even lenses having different identification codes or other factors as long as their focus types are the same.

This technique can reduce a memory space required for image restoration while reducing the deterioration of the image quality of a restored image. Especially, this effect is useful for imaging apparatuses, since most of imaging apparatuses have a limited memory capacity compared to information processing apparatuses.

A plurality of filters may be preferably stored for each combination of an imaging condition such as a focal length, an F-number, and an object distance, and an image height under that imaging condition.

Now, an operation of the imaging apparatus illustrated in FIG. 10 will be described. First, an image processing unit 204 acquires an image a2 captured by a negative-lead type and rear focus type lens of the imaging apparatus 100, and information for allowing identification of the focus type of the interchangeable lens, which is stored in a memory of the interchangeable lens, as identification information a1.

In the second exemplary embodiment, if the imaging apparatus 100 is an apparatus integrally equipped with an optical system such as a compact camera, information indicating the focus type stored in advance in the memory of the compact camera may be used as the identification information. If the imaging apparatus 100 is a system similar to the first exemplary embodiment, the imaging apparatus 100 may write information indicating the focus type of a lens into the EXIF information added to an image.

Then, in the imaging apparatus 100, the image processing unit 204 refers to the identification information a1 and acquires the optical transfer characteristic filter group No. 1 from the storage unit 208. Subsequently, the imaging apparatus 100 convolutes the optical transfer characteristic filter group No. 1 to the image a2, and thereby generating a restored image.

Lastly, the imaging apparatus 100 applies camera signal processing such as demosaicing to the restored image, thereby outputting an output image a3. The imaging apparatus 100 may perform the restoration processing and the camera signal processing in a different order.

The storage unit 208 may desirably store a filter as an average of optical transfer characteristic filters of a plurality of negative-lead type and rear focus type lenses, as a filter in the optical transfer characteristic filter group No. 1.

This arrangement can reduce a difference from an ideal optical transfer characteristic filter when the imaging apparatus 100 restores images captured by various negative-lead type and rear focus type lenses, thereby improving the accuracy.

The imaging apparatus 100 performs the same processing, even when a negative-lead type and front (front lens) focus type lens is mounted onto the imaging apparatus 100, instead of the above-described rear focus type interchangeable lens. Further, the imaging apparatus 100 may perform correction processing on the optical transfer characteristic filters acquired within the imaging apparatus 100.

The optical transfer characteristics stored in the storage unit 208 of the imaging apparatus 100 each is not limited to a filter having two-dimensional pixel data, but may be, for example, an optical transfer function, a point spread function, a wave-front aberration, and a pupil function. However, if the main memory of the imaging apparatus 100 has only a small capacity (the capacity of the random access memory (RAM)), selecting optical transfer characteristic filters as data stored in the storage unit 208 is effective, since the imaging apparatus 100 in this case is inadequate for high-speed processing unlike information processing apparatuses having a large memory capacity.

If stored optical transfer characteristics are filters, the imaging apparatus 100 can speed up the processing due to the unnecessity of a calculation requiring a large calculation amount such as a Fourier transform when performing image restoration processing.

As is used herein, the term "filter group" refers to one set of filters applied to a single image, so that a plurality of filter groups means that a plurality of such sets is stored in the storage unit.

An image processing system will be described as a third exemplary embodiment with reference to FIG. 11. Differences from the first exemplary embodiment are that the image processing system according to the third exemplary embodiment includes a storage unit 860 in an external apparatus 880, and optical transfer characteristics stored in the storage unit 860 are not restoration filters as they are.

Imaging apparatuses 1 and 2 each are an imaging apparatus having a negative-lead type imaging optical system. An imaging apparatus 3 is an imaging apparatus having a positive-lead type imaging optical system.

An optical transfer function No. 1 (optical transfer characteristic), which is commonly usable for the imaging apparatuses 1 and 2, and an optical transfer function No. 2 (optical transfer characteristic), which corresponds to the imaging apparatus 3, are stored in the storage unit 860 in advance based on the similarity among the optical transfer functions.

Now, how the storage unit 860 holds optical transfer functions will be described. The storage unit 860 stores optical transfer characteristics discretely arranged in an optical transfer characteristic expression space having a plurality of optical transfer characteristic expression vectors. The optical transfer characteristic expression vectors are vectors capable of expressing natures of optical transfer characteristics.

Examples of optical transfer characteristic expression vectors include the following components. Considering an imaging characteristic in terms of aberration, an imaging characteristic under a certain imaging condition can be expressed by a combination of, for example, a spherical aberration component, an astigmatism component, and a coma aberration component. A mathematical expression thereof is a Zernike polynomial and is known as a wave-front aberration expressed in a Cartesian space.

On the other hand, considering an aberration in terms of point spread function (PSF), a spherical aberration can be expressed by a rotationally symmetric spread component of a point spread function, and an astigmatism can be expressed by an aspect ratio component in perpendicular two directions (for example, the meridional direction the and sagittal direction) of a point spread function.

Further, a coma aberration can be expressed by an asymmetric component about a symmetry axis of a line-symmetrical point spread function. The reference point of the asymmetric component is, for example, an intersection point between a light ray passing through the center of a light flux and an imaging surface, an intersection point between a light ray passing through the center of a diaphragm and an imaging surface, or a centroid of a point spread function.

Figure 13:
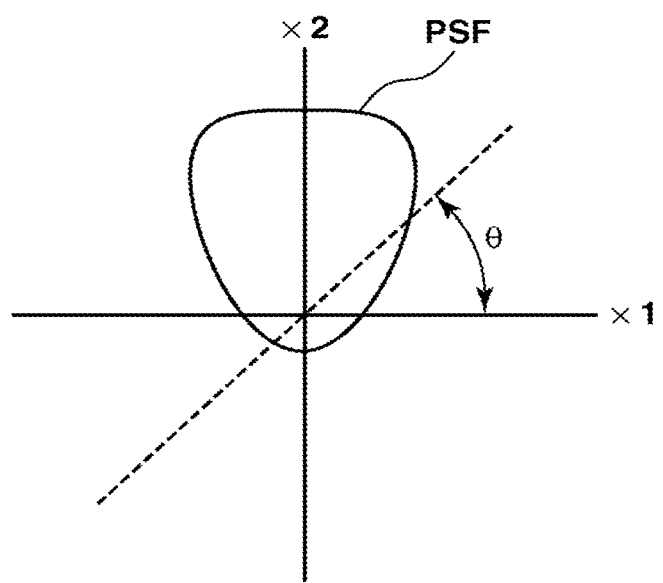
FIG. 13 illustrates an azimuth direction and symmetry of a point spread function (PSF).

FIG. 13 illustrates an example of a point spread function when a coma aberration occurs. The coma aberration is asymmetric about an x1 axis, but is symmetric about an x2 axis. In FIGS. 13, x1 and x2 represent perpendicular coordinate axes passing through the center of a point spread function on an imaging surface, and θ represents an azimuth angle when the x1 axis is set as a basis. The center of the point spread function is an intersection point between the principal ray of a reference wavelength and an imaging surface, or the centroid of the point image of the reference wavelength.

Further, a chromatic aberration of magnification can be expressed by a centroid deviation component among point images of different color components. The components are, for example, color components such as R, G, and B.

These expressions based on aberrations or a point spread function are defined as optical transfer characteristic expression vectors. Further, an optical system having a double size generates a point image having a double size, so that a component defining a size of a point image based on proportional multiplication can be also defined as one of the optical transfer characteristic expression vectors.

Figure 12A:
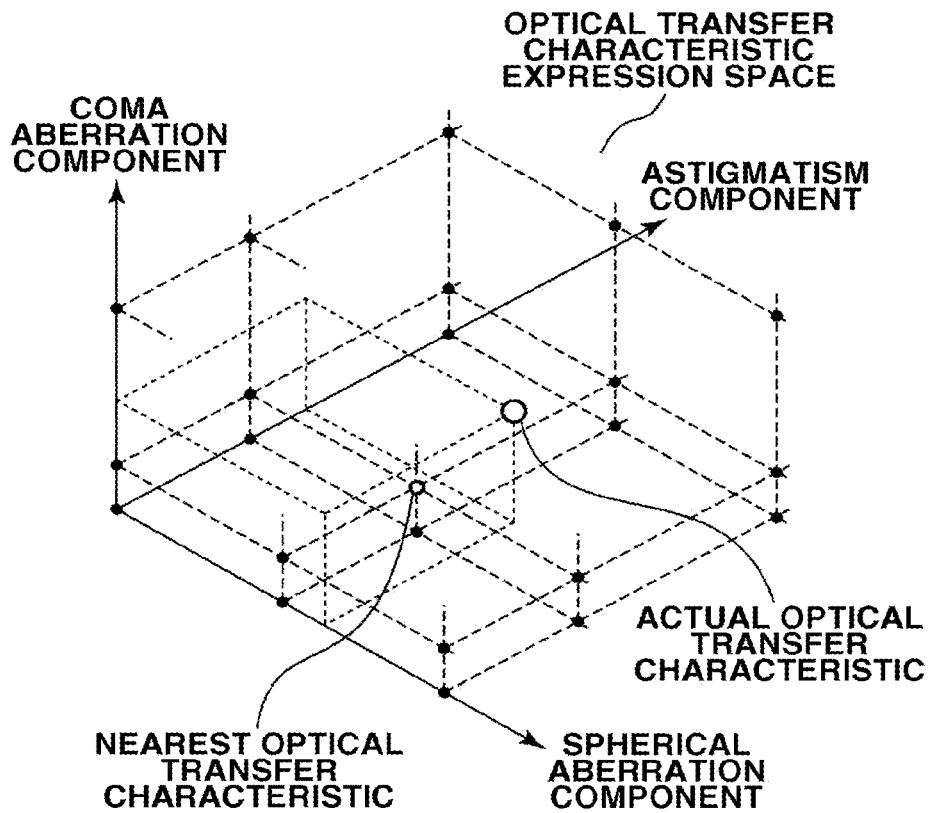
FIGS. 12A and 12B illustrate an optical transfer characteristic expression space.
Figure 12B:
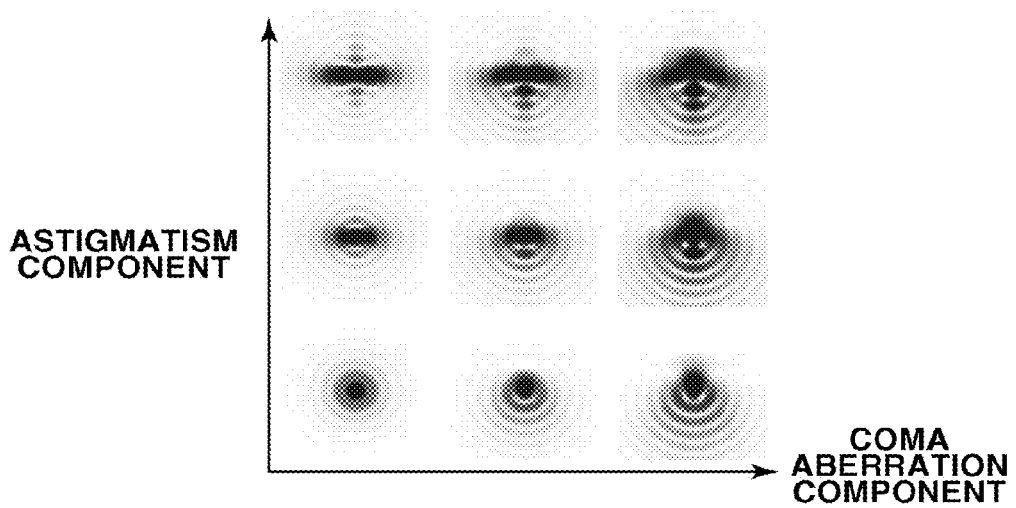

FIGS. 12A and 12B schematically illustrate the optical transfer characteristic expression space. FIG. 12A schematically illustrates a space expressing optical transfer characteristics with the respective coordinate axes representing a spherical aberration component, an astigmatism component, and a coma aberration component.

FIG. 12B illustrates a part of a cross section where the astigmatism is almost close to zero, taken along a plane parallel to the axis of astigmatism component and the axis of coma aberration component. FIG. 12B illustrates discretely positioned point spread functions (PSFs) with the horizontal axis and the vertical axis representing the coma aberration component and the astigmatism component, respectively.

The storage unit 860 stores point spread functions (optical transfer characteristics) corresponding to the respective points (black points) in the optical transfer characteristic expression space. The storage unit 860 may store optical transfer characteristics corresponding to states of positions offset from the grid points, as well.

Use of such optical transfer characteristic expression vectors can eliminate the necessity of storing restoration filters corresponding to all optical transfer characteristics that each imaging apparatus may have in the storage unit 860. In other words, a restoration filter can be generated by selecting a near point from the representative points (specific optical transfer characteristics) and using the optical transfer characteristic of the near point.

For example, if the optical transfer characteristic of an imaging apparatus is the point indicated by a large white circle in FIG. 12A, the restoration filter therefor can be generated based on the optical transfer characteristic (the small white circle illustrated in FIG. 12A) positioned the shortest distance away from the point of the actual optical transfer characteristic, among the optical transfer characteristics stored in a storage area.

Alternatively, interpolation may be applied for points between represent points. As a result, it is possible to generate the optical transfer characteristic corresponding to the actual optical transfer characteristic, whereby it is possible to reduce a data storage capacity compared with a system that stores all of restoration filters corresponding to respective imaging conditions.

Desirably, the number of divided grids may be such a number that, with respect to a specific coordinate axis, the range from the minimum value (zero) to the maximum value is divided into, approximately, 3 grids to 20 grids.

Division by less than 3 (as the number of discrete values) results in generation of a large difference between pre-stored optical transfer characteristics, and an actual imaging condition or the optical transfer characteristic of an imaging apparatus, thereby reducing the image restoration effect. On the other hand, division by more than 20 results in a large number of optical transfer characteristics that should be stored in advance, thereby undermining the data storage space reduction effect.

An example illustrated in FIG. 12A is a three-dimensional optical transfer characteristic expression space expressed by three parameters (spherical aberration, coma aberration, and astigmatism). However, for example, the optical transfer characteristic expression space may be a four-or-more-dimensional optical transfer characteristic expression space that expresses four or more states through an addition of, for example, a magnification chromatic aberration component. In this case, use of a space expressing an optical transfer characteristic with four or more aberration components set as axes can further improve the accuracy of the image restoration.

Defining an optical transfer characteristic expression space in the above-described manner can prevent a same optical transfer characteristic from being redundantly stored while building an optical transfer characteristic expression space that can cover all possible optical transfer characteristics, thereby enabling an efficient reduction in the data storage space occupied in the image processing system.

As a result, it is possible to efficiently acquire the image restoration effect while reducing a data amount stored in the image processing system.

The third exemplary embodiment has been described based on an example using point spread functions as optical transfer characteristics. However, the optical transfer characteristics stored in the storage unit 860 may be restoration filters themselves, like the first exemplary embodiment.

Alternatively, the optical transfer characteristics stored in the storage unit 860 may be any of Seidel's aberrations corresponding to imaging conditions of an imaging apparatus, or any of point spread functions, optical transfer functions, restoration filters, wave-front aberrations, and pupil functions.

The system illustrated in FIG. 11 is now described again. Identification information 802*a* from the imaging apparatus 1 is provided as coordinates in the optical transfer characteristic expression space stored in the storage unit 860. An optical transfer characteristic acquisition unit 810 transfers this identification information to the external apparatus 880, and acquires the optical transfer function corresponding to the specified coordinates from the optical transfer functions in the storage area.

At this time, if the external apparatus 880 has a calculation unit, the optical transfer characteristic acquisition unit 810 may acquire an optical transfer function after interpolation processing is applied to the identified optical transfer function.

For example, it is assumed that the state indicated by the large white circle in FIG. 12A is coordinates identified based on the identification information. If there is any optical transfer characteristic corresponding to a grid point located at or near the coordinates identified based on the identification information, the optical transfer characteristic at this grid point can be acquired to be used in the image restoration processing.

On the other hand, if there is no grid point having an optical transfer characteristic at or near (or nearest to) the coordinates identified based on the identification information, interpolation processing is applied to the optical transfer characteristic located at a position nearest to the coordinates identified based on the identification information to acquire the optical transfer characteristic corresponding to those coordinates.

Execution of interpolation processing can further reduce a difference between the actual optical transfer characteristic of the imaging apparatus and the optical transfer characteristic identified based on the identification information, thereby realizing the image restoration processing with higher accuracy.

As another method, the optical transfer characteristic can be acquired by calculating a distance between the coordinates identified based on the identification information and a pre-stored optical transfer characteristic in the optical transfer characteristic expression space, and selecting the one having the shortest distance.

Still another method is adding a weight according to a direction in the optical transfer characteristic expression space, using a product of a distance in the optical transfer characteristic expression space function and the directional weight as an evaluation function, and acquiring an optical transfer characteristic for interpolation processing based on the evaluation function.

Examples of other methods include a method of assigning identification numbers to optical transfer characteristics stored in the storage area, and acquiring the optical transfer characteristic having an identification number matching the identification number input as identification information.

Still another possible method is a method of acquiring the optical transfer characteristic by relating identification information added (attached) to an image with an address in the storage area. Alternatively, there is also a method of acquiring the optical transfer characteristic by analyzing a plurality of images.

In this way, an aim of the optical transfer characteristic acquisition unit 810 is to acquire an optical transfer characteristic identified base on identification information, and may employ various methods to achieve this aim, in addition to the above-described methods.

Then, if the optical transfer characteristic acquired by the optical transfer characteristic acquisition unit 810 is an optical transfer function, a restoration filter generation unit 820 generates a restoration filter by performing a reverse Fourier transform thereto.

If the optical transfer characteristic is provided as a point spread function, an optical transfer function, or a wave-front aberration, the restoration filter generation unit 820 can generate a restoration filter by performing a Fourier transform or a reverse Fourier transform.

On the other hand, camera signal processing 840a is performed on an image acquired from the imaging apparatus 1, and image restoration processing 830 is performed on this image with use of the restoration filter generated by the restoration filter generation unit 820.

Then, the image processing apparatus 870 performs camera signal processing 840b again on the restored image acquired from the image restoration processing 830, and then outputs an output image 850.

The above-described processing is also performed for imaging apparatuses 2 and 3. A main processing flow is the same as the flow illustrated in FIG. 7, and therefore the description thereof is omitted here.

The exemplary embodiments of the present invention have been contrived based on the discovery that, when imaging apparatuses are of a same lens type or of a same focus type, these imaging apparatuses have similar optical transfer characteristics (show similar imaging characteristics). Then, the exemplary embodiments of the present invention can reduce a data storage space by storing a restoration filter representative of similar optical transfer characteristics in the storage unit in advance.

Then, the optical transfer characteristic acquisition unit acquires the optical transfer characteristic identified based on identification information, and the image is restored based on the acquired optical transfer characteristic, thereby enabling generation of a high-quality restored image while reducing a data storage capacity.

As described in the description of the third exemplary embodiment, if the stored optical transfer characteristics are not restoration filters themselves, the restoration filter generation unit 820 generates a restoration filter based on the optical transfer characteristic.

The restoration filter may be generated with use of a calculation such as a Fourier transform or a reverse Fourier transform. Alternatively, restoration filters may be stored in the storage unit 860 or another storage area in such a manner that one restoration filter corresponds to one optical transfer function, and then the stored restoration filter may be used.

If an optical transfer characteristic for use in image restoration processing is acquired by performing interpolation on the pre-stored optical transfer characteristics, the interpolation accuracy can be improved by using a point spread function or an optical transfer function. The reason therefor will be described, referring to FIGS. 8A and 8B again.

FIG. 8A schematically illustrates a restoration filter having 11-by-11 taps. As illustrated in FIG. 8B, the restoration filter has a drastic change among the taps, but the point spread function thereof has a smooth intensity change as illustrated in FIGS. 5A and 5B. The optical transfer function also has a smooth intensity change.

For this reason, performing interpolation processing with use of a point spread function or an optical transfer function can improve the interpolation accuracy.

However, when interpolation processing is performed with use of a point spread function or an optical transfer function, a Fourier transform or a reverse Fourier transform should be performed for a conversion into a restoration filter. Although this increases the processing time, execution of a Fourier transform or a reverse Fourier transform enables a restoration filter to be generated according to a restoration degree.

On the other hand, if a restoration filter itself is used as an optical transfer characteristic, the processing can be sped up due to the unnecessity of execution of a Fourier transform or a reverse Fourier transform, but the accuracy of image restoration processing is reduced in this case as described above. Therefore, it is important to find how much the accuracy and the processing time can be compromised or should be prioritized, respectively.

Further, optical transfer characteristics may be stored in the form of functions capable of expressing optical transfer characteristics as F(x, y, z), instead of storing them in the form of vectors. However, compared to this method, it may be more effective to store optical transfer characteristics as vectors (expressions) as indicated by the third exemplary embodiment, since this method can further reduce a data amount in most cases. This is because, when optical transfer characteristics are stored in the form of functions, some function may be complicated depending on the accuracy, thereby leading to an increase in the data amount.

The external storage unit may be embodied by a storage area of an external apparatus or an area in a network.

In the first exemplary embodiment, even images captured under different imaging conditions are restored with use of a common optical transfer characteristic, as long as the images involve similar optical transfer characteristics.

In the first exemplary embodiment, assuming that R'(x, y) represents a common optical transfer characteristic filter (hereinafter referred to as "restoration filter") stored in the storage unit 320, an image f'(x, y) acquired from image restoration processing can be expressed by the following equation, like the equation 4.

$$g(x,y)*R'(x,y)=f'(x,y) \qquad \text{(EQUATION 4')}$$

In this equation, the mark "*" indicates a convolution operation.

Since f'(x, y) is different from f(x, y) which is calculated with use of the restoration filter R(x, y) calculated from an actual optical transfer characteristic, the following phenomenon may occur in the image.

If the restoration degree of the restoration filter R'(x, y) is stronger than the restoration filter R(x, y), a portion having a low signal value (digging-down component) is generated at an edge portion or in the vicinity thereof in the image.

This is because the restoration filter R'(x, y) in this case strongly exerts the effect of returning spatially spread signal values due to an aberration to an original single point, so that the signal values in the vicinity thereof become insufficient. This phenomenon is a similar phenomenon to an overshoot state which occurs due to excessive application of edge enhancement processing.

On the other hand, if the restoration degree of the restoration filter R'(x, y) is weaker than the restoration filter R(x, y), it is difficult to sufficiently eliminate blur appearing in an image due to an aberration of an optical system. This is because the restoration filter R'(x, y) in this case weakly exerts the effect of returning spatially spread signal values due to the aberration to an original single point.

Further, if this phenomenon variably occurs depending on RGB channels (color components), coloring occurs at an edge portion due to a difference in the sharpness of the edge portion.

Therefore, in a fourth exemplary embodiment, as illustrated in FIG. 14A, a storage unit 920A stores restoration filters patterned according to a part of an optical transfer characteristic. A part of an optical transfer characteristic means, for example, a phase component of an optical transfer function or an amplitude component of an optical transfer characteristic.

As is used herein, the term "pattern" is defined to refer to categorizing imaging apparatuses having similarity in how their imaging is deviated (deteriorated) from an ideal phase distribution or an amplitude distribution due to the interposition of an optical system into a same group, or assigning a restoration filter capable of providing suitable phase restoration to each of thus-categorized groups.

In other words, the storage unit 920A stores restoration filters each having a commonly usable phase correction component. As a result, it is possible to reduce a data storage capacity while preventing a deterioration of an image quality.

Now, the processing that the program causes an information processing apparatus 900A to execute will be described with reference to FIGS. 14A and 14B.

Imaging apparatuses 900a and 900b are imaging apparatuses having similarity in how a coma aberration appears. In an image captured by an imaging apparatus 900c, a coma aberration appears in a different manner from images captured by the imaging apparatuses 900a and 900b.

In step S91, a CPU of the information processing apparatus 900A (hereinafter, referred to as just "CPU") acquires image data 901a, 901b, and 901c, and identification information 902a, 902b, and 902c from the imaging apparatuses 900a, 900b, and 900c. The identification information in the fourth exemplary embodiment is an identification code of an imaging optical system.

In step S92, the CPU acquires restoration filters to restore the image data 900a, 900b, and 900c based on the identification information from the storage unit 920A.

Since coma aberrations appear in a same manner in the images captured by the imaging apparatuses 900a and 900b, the CPU acquires a phase component correction filter No. 1, which is commonly usable, based on the identification information 902a and 902b. The CPU acquires a phase component correction filter No. 2 for the image 901c captured by the imaging apparatus 900c.

In step S93, the CPU generates restored images by restoring the phase components with use of the phase component correction filters corresponding to the respective pieces of image data. The phase component correction filters can correct not only a coma aberration but also an asymmetrical aberration such as a chromatic aberration of magnification. In step s94, the CPU outputs an output image 950A.

As described above, even images captured under imaging conditions different from each other can be restored with use of a common restoration filter as a phase component correction filter depending on how an asymmetrical aberration appears, so that it is possible to reduce a data storage capacity.

The functions of the above-described embodiment can also be realized by an optical transfer characteristic acquisition unit 910A, an image restoration unit 930A, a signal processing unit 940A in FIG. 14A instead of the CPU.

Further, although restoring image data having coma aberrations appearing in different manners by using a same optical transfer characteristic may result in an increase in coloring, the above-described processing can shift signal values spread due to an aberration in a direction making the point image line-symmetric. Therefore, the amplitude component of the optical transfer characteristic can be unaffected, thereby preventing an edge portion from being dug down.

An amplitude component of an image can be corrected with use of an edge enhancement filter illustrated in FIG. 16. Application of edge enhancement processing can improve sharpness of an image. The degree of edge enhancement can be easily adjusted, so that a desired effect can be acquired by adjusting the value to a most appropriate value as necessary.

Then, in step S93, the CPU performs other signal processing such as white balance adjustment processing and noise reduction processing on the respective restored images, and then outputs the output images. In the above description, edge enhancement processing and signal processing have been described as separate processes, but they may be performed at the same time.

Further, coefficients of the edge enhancement filter illustrated in FIG. 16 can be changed to be used as necessary according to the first derivation, the second derivation, and gains thereof (the degree of restoration).

Further, another advantageous effect of the present exemplary embodiment is that image restoration processing is applied to only a phase component, and the sharpness is adjusted by edge enhancement processing, thereby eliminating the necessity of generation of a restoration filter according to the degree of restoration, and realizing high-speed processing.

For the restoration filter (phase component correction filter) for use in correction of a phase component, increasing the number of taps (size) of the filter can realize a further accurate correction of a phase deterioration. Therefore, it may be effective to set a number three times or more the number of taps on a side of the edge enhancement filter, as the number of taps on a side of a restoration filter that has a largest number of taps in an image.

It may be further effective to set a number three times or more, and ten times or less. If a restoration filter has taps of a number below the lower limit, this filter cannot correct a phase deterioration with high accuracy, so as to be unable to sufficiently correct asymmetry of an aberration. On the other hand, if a restoration filter has taps of a number over the upper limit, although this filter can improve the correction accuracy, the data storage capacity is increased, and the processing speed is slowed down due to the filter having a large number of taps.

As a modification of the fourth exemplary embodiment, as illustrated in FIG. 15, amplitude components of optical transfer characteristics may be patterned, and the storage unit 920 may store restoration filters (amplitude component common filters) corresponding thereto, and the CPU may use them.

The CPU of the information processing apparatus 900A acquires images 961a, 961b, and 961c captured by imaging apparatuses 960a, 960b, and 960c, and identification information 962a, 962b, and 962c. The CPU acquires an amplitude component common filter identified based on the identification information among amplitude component filters stored in advance in the storage unit 920A, based on the identification information 962a, 962b, and 962c attached to the images 961a, 961b, and 961c, respectively.

This amplitude component common filter may be an optical transfer characteristic having an amplitude component of an average of amplitude components of RGB channels of an image, or may be an optical transfer characteristic obtained by adding weights to the optical transfer characteristics of RGB channels and averaging them. Then, a restored output image 950A is generated with use of the acquired amplitude component common filter.

Use of such an amplitude component common filter can increase sharpness of an image alone without changing a component of magnification chromatic aberration.

The fourth exemplary embodiment has been described based on an example in which the CPU causes the information processing apparatus 900A to execute the respective steps. However, the respective steps may be performed by hardware.

A fifth exemplary embodiment will be described as an embodiment which geometrically extends or contracts an image for each RGB channel, i.e., corrects a chromatic aberration of magnification (extension/contraction processing) with use of a restoration filter not including a component for correcting a chromatic aberration of magnification, thereby providing the effect of further reducing coloring at an edge portion caused by image restoration processing.

Now, an image processing system according to the fifth exemplary embodiment will be described with reference to FIG. 17. An arbitrary number of imaging apparatuses can be connected to an image processing apparatus 119 illustrated in FIG. 17, and in the present exemplary embodiment, imaging apparatuses 1 and 2 are connected to the image processing apparatus 119.

The imaging apparatuses 1 and 2 have similar magnification chromatic aberration characteristics. Images captured by these imaging apparatuses 1 and 2 contain information called EXIF information, which indicates an imaging condition such as the identification code of the imaging apparatus, the focal length of the lens when capturing the image, and the F-number.

In the present exemplary embodiment, this information is used to generate an identification code for enabling identification of an optical transfer characteristic, which is then used as identification information.

Image data 111a output from the imaging apparatus 1 is transmitted to the image processing apparatus 119. The program causes the image processing apparatus 119 or an information processing apparatus to execute the following processing.

First, in step S114, the image processing apparatus 119 refers to identification information 112a contained in the image data 111a, and then acquires the optical transfer characteristic identified based on the identification information 112a from optical transfer characteristics stored in a storage area 118. The optical transfer characteristic used here is an optical transfer characteristic filter No. 1, which is acquired by averaging the optical transfer characteristics with respect to the RGB channels of the camera.

Restoring only an amplitude component by using such a filter can result in improvement of only sharpness while the magnification chromatic aberration component is not changed. Therefore, in step S113, the image processing apparatus 119 performs magnification chromatic aberration correction processing, i.e., the processing of geometrically extending an image, on the image output from the imaging apparatus 1.

This processing can produce an image with its magnification chromatic aberration corrected while reducing coloring due to the magnification chromatic aberration, from the image data 111a. Subsequently, in step S115, the image processing apparatus 119 generates a restored image with use of the image with its magnification chromatic aberration corrected, and the optical transfer characteristic acquired in step S114.

In step S113, the image processing apparatus 119 performs image restoration processing on the image with its magnification chromatic aberration geometrically corrected, and thereby it is possible to reduce occurrence of coloring compared to a restored image generated by performing image restoration processing on an image without its magnification chromatic aberration geometrically corrected.

Then, in step S116, the image processing apparatus 119 performs signal processing such as white balance adjustment processing, noise reduction processing, and edge enhancement processing on the restored image, and in step S117, the image processing apparatus 119 can acquire an output image.

The program also causes the image processing apparatus 119 to execute the processing on image data 111b captured by the imaging apparatus 2 in the same manner as the processing for the imaging apparatus 1. Since the imaging apparatus 2 has a similar magnification chromatic aberration characteristic to the imaging apparatus 1, in step S114, the image processing apparatus 119 can use the same optical transfer characteristic (amplitude component common filter No. 1) as the imaging apparatus 1.

In this way, it is possible to reduce the data storage capacity by using an optical transfer characteristic (amplitude component in the present exemplary embodiment), a part of which is adapted to be commonly usable. Further, coloring can be further reduced by separately performing a geometric magnification chromatic aberration correction from image restoration processing, like the present exemplary embodiment.

Further, optical transfer characteristics may be desirably prepared in advance according to not only similarity in how a chromatic aberration of magnification appears, but also for example, a zoom type, a focus type, and an image stabilization type. In this case, even when a new imaging apparatus 3 is connected (communicably) after the establishment of the image processing system, and the image processing apparatus 119 restores image data 111c captured by the imaging apparatus 3, appropriate image restoration can be performed.

A sixth exemplary embodiment will be described as an example which acquires an optical transfer characteristic filter according to a pixel position in an image with use of information about a lens configuration as identification information. The present exemplary embodiment will be described by referring to FIG. 4 again, which illustrates the first exemplary embodiment, since there are many overlaps between the present exemplary embodiment and the first exemplary embodiment.

According to the conventional techniques, if an imaging apparatus produces an image containing ten million or more pixels, it will take a long time to acquire optical transfer characteristics for the respective pixels. One method to reduce the processing time is a method of using a same optical transfer characteristic for both an area and another area in an image.

However, this method results in generation of a discontinuous line at the boundary between areas to which the same optical transfer characteristic is used. This can be made inconspicuous by using a same optical transfer characteristic for areas (shift invariant areas) between which an image quality difference cannot be detected under an image evaluation environment.

Employing this method can reduce the number of required optical transfer characteristics to approximately one-104th of the number of pixels in an image. However, even in this case, an information processing system should acquire approximately 103 optical transfer characteristics.

Therefore, the sixth exemplary embodiment uses a lens configuration and an imaging condition as identification information to acquire optical transfer characteristics according to the respective pixels. The sixth exemplary embodiment utilizes the facts that similarly configured two lenses have similarity under a same imaging condition in how an aberration appears and what kind of tendency the point spread function has, and that such lenses maintain the similarly in tendency at any pixel position throughout a whole image.

For example, a negative-lead type zoom lens has occurrence of a curvature of field at the wide-angle end thereof, while a positive-lead type zoom lens, which is used as a high power zoom lens, has occurrence of a large axial chromatic aberration at the telephoto end thereof, and a coma aberration at the periphery thereof.

In this way, lenses of a same type show similar tendencies, because these lenses have occurrence of an aberration in similar manners at each surface thereof, and the amounts of aberrations occurring at the respective lenses are also at the same level, provided that they satisfy a certain performance.

The similarity in the tendency of aberration occurrence exists according to not only the configuration of a zoom lens group in an optical system of an imaging apparatus, but also single lenses of a same lens type (for example, a Gauss type, a telephoto type, and a retro focus type) show similar tendencies at any pixel position throughout a whole image. Further, the tendency about how an aberration appears can be also classified according to a focus type, an image stabilization type, and a diaphragm shape.

The image processing system according to the sixth exemplary embodiment includes three imaging apparatuses 100, 101, and 102. Each of the imaging apparatuses 100, 101, and 102 is constituted by an interchangeable lens and a camera main body according to a known interchangeable-lens camera system, or is a compact camera integrally including a lens and an image sensor.

In the present exemplary embodiment, the imaging apparatuses 100, 101, and 102 each are constituted by an interchangeable lens and a camera main body. Images captured by these imaging apparatuses 100, 101, and 102 contain information called EXIF information, which is information about an imaging condition such as the identification code of the imaging apparatus, the focal length of the lens that has captured the image, and the F-number.

In the sixth exemplary embodiment, the information processing apparatus 200 detects a group configuration of an interchangeable lens based on the identification code of the interchangeable lens among the identification codes of the imaging apparatus. The imaging optical system of the imaging apparatus 100 is a negative-lead type zoom lens having a group configuration of negative-positive-negative-positive. This lens type is characterized in that the retro ratio (total lens length/focal length) is increased at the wide-angle end thereof, and a large curvature of field and a large distortion tend to occur, while an axial spherical aberration seldom occurs.

The storage unit 320 stores optical transfer characteristic filters corresponding to the respective pixel positions for a negative-lead type zoom lens. Further, the storage unit 320 may desirably store optical transfer characteristic filters based on an optical transfer characteristic calculated as an average of optical transfer characteristics of a plurality of negative-lead type lenses.

In this case, the information processing apparatus 200 can use an optical transfer characteristic less different from an actual optical transfer characteristic even when the information processing apparatus 200 restores images captured by various negative-lead type zoom lenses, so that this arrangement is advantageous to improvement of the accuracy of image restoration processing.

The CPU 310 acquires a group of optical transfer characteristic filters corresponding to the respective pixel positions in the lens configuration of the imaging apparatus 100, based on the acquired identification code of the interchangeable lens and the acquired imaging condition. Then, the CPU 310 performs restoration processing on the image 101 by using the group of optical transfer characteristic filters, and generate a restored image.

The CPU 310 further performs camera signal processing such as a white balance adjustment, an edge enhancement, a magnification chromatic aberration correction, a distortion correction, and a shading correction on the generated image, thereby obtaining an output image.

In other words, once the information processing apparatus 200 is provided with the configuration of the imaging optical system and the imaging condition, the information processing apparatus 200 can identify the optical transfer characteristic, whereby the information processing apparatus 200 can acquire the optical transfer characteristic filters corresponding to required pixel positions by performing optical transfer characteristic acquisition processing only once, so that the processing speed can be increased.

The present exemplary embodiment can be combined with interpolation processing. In this case, it is possible to reduce the number of required optical transfer characteristic filters, so that the processing speed can be further increased. The interpolation processing is the method of acquiring optical transfer characteristics corresponding to a plurality of specific pixel positions in an image, and calculating an optical transfer characteristic corresponding to an arbitrary pixel position by an interpolation calculation.

For example, the information processing apparatus 200 makes a calculation with use of an optical transfer characteristic A for restoring a first region in an image and an optical transfer characteristic B for restoring a second region in the image, and then generates an optical transfer characteristic C for restoring a third region between the first region and the second region.

Further, the identification information may desirably be information for allowing identification of a correction coefficient regarding a pixel position. The correction coefficient is a coefficient calculated to a coefficient or a value of an optical transfer characteristic A acquired for a pixel A, in such a situation that it is possible to get advance knowledge about how an aberration appears at each pixel position in an image.

As a result, it is possible to generate an optical transfer characteristic A' for restoring a pixel A' by using the optical transfer characteristic A. This is because the restoration accuracy can be improved, since a slight correction can be made to image restoration processing even in a same configuration by using correction information.

For example, the luminance level after restoration can be adjusted by proportionally multiplying a whole restoration filter to change the normalizing constant of the filter, or the degree of restoration can be controlled by adjusting an extent of a restoration filter.

If the imaging apparatus 101 has the same lens configuration as the imaging apparatus 100, the processing time can be reduced by acquiring the lens configuration and the imaging condition as the identification information, and executing the above-described processing. The method of acquiring optical transfer characteristics for respective pixel positions according to the sixth exemplary embodiment is especially effective when there is no object distance information.

In the image restoration processing, when the imaging apparatus or a part of the imaging condition cannot be identified, this makes it difficult to identify the optical transfer characteristic. Therefore, the imaging condition may desirably be identified.

However, generally, most imaging apparatuses output a captured image with exposure information and focal length information added thereto, but may omit an addition of object distance information since an important point about an object distance is just whether an image is in focus.

Therefore, an imaging apparatus determines whether an object distance is attached to the additional information of an image (first determination process). If object distance information is not attached, the imaging apparatus can determine the object distance in the following manner. The imaging apparatus performs image restoration processing several times with the object distance set as a variable, and determines the object distance from the value of the variable corresponding to the image having the highest degree of restoration among a plurality of restored images generated as a result of the repeated image restoration processing.

For example, this method can be applied to the processing of calculating a contrast value of a restored image and calculating an optimal object distance with use of the contrast value as an evaluation value (evaluation process, second determination process), such as contrast automatic focus (AF). More specifically, the imaging apparatus determines which evaluation value is larger, and sets the value of the variable corresponding to the evaluation value determined as the smallest value, as the object distance information (setting process).

In this way, when image restoration processing is performed several times, employing the present exemplary embodiment is effective since this can abbreviate one operation of optical transfer characteristic acquisition processing. In addition, the absent information is not limited to an object distance, and the present exemplary embodiment can be applied as well even when the absent information is, for example, a focal length, an F-number, or an image stabilization state.

The present exemplary embodiment uses a common optical transfer characteristic even for different imaging apparatuses as long as the imaging apparatuses have similar optical transfer characteristics, which is the same feature as the first exemplary embodiment, so that the present exemplary embodiment can also provide the effect of reducing a data storage capacity.

The present exemplary embodiment has been described based on an example in which object distance information is not attached to an image. However, it is not limited thereto, and even when unattached information is other imaging condition information, the above-described processing can be applied to determine that information.

Now, a seventh exemplary embodiment of an image processing system will be described with referent to FIG. 10 again. A difference between the image processing system according to the seventh exemplary embodiment and the first exemplary embodiment is that, in the seventh exemplary embodiment, the main body of the imaging apparatus (camera main body) or the storage area (storage unit) in the imaging optical system (interchangeable lens) stores optical transfer characteristics.

If an imaging apparatus has a small limited storage capacity, the imaging apparatus cannot perform processing as fast as an information processing apparatus, so that the storage area may desirably store optical transfer characteristic filters in such a case.

This is because, if stored optical transfer characteristics are filters themselves, the imaging apparatus can omit the processing of generating an optical transfer characteristic filter by applying a Fourier transform or a reverse Fourier transform to an optical transfer characteristic when performing image restoration processing.

The imaging optical system of the imaging apparatus 1 according to the seventh exemplary embodiment is a not-illustrated negative-lead type and rear focus type lens. The storage area thereof stores a group of optical transfer characteristics for a negative-lead type and rear focus type lens.

The storage area may store, as this optical transfer characteristic filter, a filter calculated by averaging filters corresponding to a plurality of rear focus lenses. In this case, the imaging apparatus can use an optical transfer characteristic filter less different from an ideal optical transfer characteristic filter even when the imaging apparatus restores images captured by various negative-lead type and rear focus type lenses. Therefore, this arrangement is advantageous to improvement of the accuracy of image restoration processing.

The imaging apparatus 1 acquires identification information added to an image. In the seventh exemplary embodiment, the identification information is information regarding a focus type of a lens such as a rear focus type lens. The optical transfer characteristic acquisition unit acquires a group of optical transfer characteristic filters corresponding to a plurality of pixel positions in the image captured by the acquired lens configuration.

The imaging apparatus may prepare a group of optical transfer characteristic filters required to restore a whole image according to a focus type of a lens in advance, and acquire it. In this case, the imaging apparatus can more quickly perform the processing than repeatedly acquiring an optical transfer characteristic filter suitable for restoring each pixel one by one.

Further, the storage area stores a group of optical transfer characteristic filters for each focus type which shows a similar optical transfer characteristic, so that it is possible to reduce a data storage capacity required for image restoration processing.

The image processing apparatus acquires the group of optical transfer characteristic filters acquired within the imaging apparatus, and performs correction processing on this group of optical transfer characteristic filters. In this example, the image processing apparatus acquires a correction coefficient corresponding to each pixel position from a not-illustrated storage area in the image processing apparatus, with use of the identification information of the lens added to the image.

Alternatively, the imaging apparatus 1 may acquire the correction coefficient, but the image processing apparatus can perform processing more quickly and secure a storage area more easily than the camera main body, so that such arrangement may be more effective to satisfy both the processing speed and the accuracy of image restoration.

Then, the image processing apparatus performs image restoration processing with use of the corrected optical transfer characteristic filters and the image, and generates a restored image. The image processing apparatus further performs camera signal processing such as a white balance adjustment, an edge enhancement, a magnification chromatic aberration correction, a distortion correction, and a shading correction on the restored image, so as to be able to acquire an output image.

The imaging optical system of the imaging apparatus 2 is a not-illustrated negative-lead type and front (front lens) focus type lens. The storage area of the imaging apparatus 2 stores a group of optical transfer characteristic filters for a negative-lead type and front focus type lens.

As is the case with the imaging apparatus 1, the storage area of the imaging apparatus 2 may desirably store an optical transfer characteristic filter calculated by averaging optical transfer characteristic filters corresponding to negative-lead type and front focus type lenses.

The imaging apparatus 2 acquires information for identifying a lens configuration and an imaging condition, and acquires a group of optical transfer characteristic filters corresponding to this configuration. The image processing apparatus acquires the group of optical transfer characteristic filters acquired within the imaging apparatus 2, and performs correction processing on this group of optical transfer characteristic filters.

Then, the image processing apparatus performs image restoration processing with use of the corrected optical transfer characteristic filters and the image to generate a restored image, and performs signal processing on the restored image to output an output image.

Programs are installed in the imaging apparatuses 1 and 2, and the image processing apparatus. The CPU of the imaging apparatus 1 executes the process of acquiring optical transfer characteristics, and the CPU of the image processing apparatus executes the process of correcting the optical transfer characteristics. Also, the CPU of the image processing apparatus performs the image restoration process.

In this way, in a case where optical transfer characteristic filters are acquired within an imaging apparatus, the present exemplary embodiment can improve the processing speed by acquiring a plurality of filter groups according to a lens configuration and an imaging condition, so that the present exemplary embodiment is especially useful when the restoration processing should use a limited storage capacity.

Now, returning to FIG. 11, an eighth exemplary embodiment of an image processing system will be described. The image processing system according to the eighth exemplary embodiment is a system in which a user introduces image data into an information processing apparatus (personal computer (PC)) having a plurality of imaging apparatuses, and then a user utilizes an image processing apparatus usable through the Internet to perform image restoration processing.

This system is characterized in that an image processing apparatus is prepared separately from an information processing apparatus, allowing utilization of the image processing apparatus having a high image processing capability. Further, a user can perform image restoration processing even without having special information regarding the image restoration processing.

The information processing apparatus acquires image data 1 and image data 2 captured by the imaging apparatus 1 and the imaging apparatus 2. The image data 1 has EXIF information added thereto, but does not have object distance information.

The image data 2 has EXIF information and object distance information added thereto. The information processing apparatus uploads the image data 1 and the image data 2 onto the Internet.

The image processing apparatus, which is located in, for example, a server on the Internet, refers to the EXIF information as identification information and acquires an optical transfer function corresponding to the identification information from optical transfer functions (OTF) stored in advance in the storage area of the image processing apparatus.

The present exemplary embodiment uses an optical transfer function, and therefore executes the process of applying a Fourier transform or a reverse Fourier transform to the acquired optical transfer function to thereby generate an optical transfer characteristic filter (restoration filter), after the process of acquiring the optical transfer characteristic.

Since the image data 2 has object distance information added thereto, the image processing apparatus can identify an optical transfer function from the identification information. On the other hand, the image data 1 does not have object distance information added thereto. Therefore, the image processing apparatus performs image restoration processing on the input image with use of a generated restoration filter (tentative optical transfer characteristic) with the object distance set as a variable (parameter) while changing the value of the variable, and generates a restored image (tentative restored image).

Then, with a contrast value of each restored image set as an evaluation value, the information processing apparatus performs the restoration processing in a hill-climbing manner until the information processing apparatus finds the largest evaluation value. The object distance is determined from the variable when the evaluation result shows the largest evaluation value. Therefore, the image processing apparatus uses the thus-determined object distance as the identification information, and then acquires an optical transfer function. Then, the image processing apparatus generates a restoration filter based on this optical transfer function.

In this way, when object distance information is unavailable, an optical transfer function should be acquired again each time the value of the object distance variable is changed. However, since the storage unit stores optical transfer functions patterned for each lens configuration, it is possible to acquire optical transfer functions corresponding to pixel positions in a whole image by one operation of processing, and therefore it is possible to speed up the processing.

Further, storing optical transfer functions patterned for each lens configuration in the storage unit can provide the effect of reducing a data storage capacity in the storage unit.

In this way, if restoring processing should be performed several times, the restoring processing may be performed by the image processing apparatus which has a high image processing capability. In this case, the processing speed can be further increased, and the effect of the exemplary embodiments of the present invention can be enhanced.

The image processing apparatus performs image restoration processing on the image data 1 and the image data 2 with use of the generated restoration filters, and generates restored images. The image processing apparatus applies camera signal processing to these restored images, thereby outputting output images. Then, these images are downloaded into the information processing apparatus, and are displayed on, for example, a display unit.

Another possible exemplary embodiment will be described. Even in a same imaging apparatus, there are different imaging conditions. Nevertheless, some of different imaging conditions may have similarity between the optical transfer characteristics corresponding to the imaging conditions. In this case, this exemplary embodiment performs image restoration with use of a same optical transfer characteristic filter. In this case, the storage unit in the imaging apparatus may store a relationship table allowing the same optical transfer characteristic to be identified from the different imaging conditions (identification information).

Further, the program may be configured so as to allow a same optical transfer characteristic to be acquired even for a plurality of imaging conditions different from one another, as long as a difference among the different imaging conditions (a difference among a plurality of pieces of identification information) is within a certain range.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

The conventional techniques require a storage of a large amount of data corresponding to respective imaging conditions in advance to realize image restoration based on an optical transfer characteristic which varies depending on imaging conditions of imaging optical systems. For example, a storage unit has to hold (store) a large number of restoration filters for each imaging condition such as a zoom position (focal length) of an imaging optical system, an object distance, a diaphragm, each pixel position (image height) in an image, and a position of an image stabilization lens.

On the other hand, the exemplary embodiments of the present invention restore even images captured under different imaging conditions with use of a same optical transfer characteristic filter, as long as similarly can be found in optical transfer characteristics corresponding to the imaging conditions. As a result, it is possible to reduce a data storage capacity required to store optical transfer characteristic filters.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent 2011-013273 filed Jan. 25, 2011, No. 2011-013274 filed Jan. 25, 2011, and No. 2011-013275 filed Jan. 25, 2011, which are hereby incorporated by reference herein in their entirety.

What is claimed is:

1. A non-transitory computer-readable storage medium storing a program for causing an information processing apparatus to execute a method comprising:
    acquiring identification information for identifying an optical transfer characteristic for restoring an image;
    acquiring, based on the identification information, the optical transfer characteristic identified, from a storage unit, wherein the storage unit stores a first optical transfer characteristic commonly usable for first and second captured images captured under different imaging conditions, and a second optical transfer characteristic usable for a third captured image; and
    generating a restored image with use of the acquired optical transfer characteristic,
    wherein the first and second captured images are images captured by imaging apparatuses different from each other.

2. The non-transitory computer-readable storage medium according to claim 1, wherein the first optical transfer characteristic is generated based on an optical transfer characteristic calculated by averaging optical transfer characteristics of the different imaging apparatuses.

3. The non-transitory computer-readable storage medium according to claim 1, wherein the optical transfer characteristic is any of Seidel's aberrations corresponding to the imaging condition, or any of a point spread function, an optical transfer function, a restoration filter, a wave-front aberration, and a pupil function.

4. The non-transitory computer-readable storage medium according to claim 1, wherein the optical transfer characteristic is an optical transfer characteristic corresponding to a coordinate in an optical transfer characteristic expression space where an axis represents any of the following components:
    an aspect ratio component in a point spread function in a real space,
    an asymmetric component in a point spread function symmetric relative to a specific direction in the real space,
    a rotation-symmetric spread component in a point spread function in the real space,
    a centroid deviation component among different color components in a point spread function in the real space, and
    a component defining a size of a point spread function in the real space by means of proportional multiplication.

5. The non-transitory computer-readable storage medium according to claim 4, wherein the identification information is a coordinate in the optical transfer characteristic expression space.

6. The non-transitory computer-readable storage medium according to claim 1, wherein the identification information contains any of a focal length, an F-number, an object distance, and an image height.

7. The non-transitory computer-readable storage medium according to claim 1, wherein the identification information contains information for identifying an imaging apparatus or an imaging optical system.

8. The non-transitory computer-readable storage medium according to claim 1, wherein the identification information is any of a group configuration of an optical system, a lens type of the optical system, a focus type of the optical system, an image stabilization type of the optical system, and an aperture diaphragm type of the optical system.

9. The non-transitory computer-readable storage medium according to claim 1, the method further comprising, generating a restoration filter usable for restoring the captured image based on the acquired optical transfer characteristic.

10. An image processing method comprising:
    acquiring identification information for identifying an optical transfer characteristic;
    acquiring, based on the identification information, the optical transfer characteristic identified, from a storage unit, wherein the storage unit stores a first optical transfer characteristic commonly usable for first and second captured images captured under different imaging conditions, and a second optical transfer characteristic usable for a third captured image; and
    restoring an image with use of the acquired optical transfer characteristic to generate a restored image,
    wherein the first and second captured images are images captured by imaging apparatuses different from each other.

11. An image processing system comprising:
    a plurality of imaging apparatuses; and
    an image processing apparatus configured to perform image restoration processing with use of an optical transfer characteristic,
    wherein the plurality of imaging apparatuses each include an output unit configured to output identification information for identifying the optical transfer characteristic from an imaging condition, and image data to the image processing apparatus, and
    wherein the image processing apparatus includes an optical transfer characteristic acquisition unit configured to acquire, based on the identification information, a restoration optical transfer characteristic, identified from a plurality of optical transfer characteristics, wherein the plurality of optical transfer characteristics is stored in advance in a storage area of the image processing apparatus, and a restoration processing unit is configured to restore the image data with use of the restoration optical transfer characteristic, to generate a restored image, wherein the storage area is configured to store a first optical transfer characteristic commonly usable for first and second captured images captured under different imaging conditions, and a second optical transfer characteristic usable for a third captured image, and wherein the first and second captured images are images captured by imaging apparatuses different from each other.

* * * * *